(12) United States Patent
Conrad

(10) Patent No.: US 8,250,702 B2
(45) Date of Patent: Aug. 28, 2012

(54) CONFIGURATION OF A CYCLONE ASSEMBLY AND SURFACE CLEANING APPARATUS HAVING SAME

(75) Inventor: Wayne Ernest Conrad, Hampton (CA)

(73) Assignee: G.B.D. Corp, Nassau (BS)

( * ) Notice: Subject to any disclaimer, the term of this patent is extended or adjusted under 35 U.S.C. 154(b) by 922 days.

(21) Appl. No.: 12/338,007

(22) Filed: Dec. 18, 2008

(65) Prior Publication Data
US 2009/0209403 A1    Aug. 20, 2009

Related U.S. Application Data

(60) Provisional application No. 61/014,983, filed on Dec. 19, 2007.

(51) Int. Cl.
A47L 9/10     (2006.01)
B01D 45/16    (2006.01)
B04C 5/187    (2006.01)

(52) U.S. Cl. .............. 15/347; 15/353; 55/345; 55/459.1

(58) Field of Classification Search .......... 15/347, 15/353; 55/345, 459.1
See application file for complete search history.

(56) References Cited

U.S. PATENT DOCUMENTS

| | | |
|---|---|---|
| 4,373,228 A | 2/1983 | Dyson et al. |
| 5,139,652 A | 8/1992 | LeBlanc |
| 6,171,356 B1 | 1/2001 | Twerdun |
| 6,406,505 B1 | 6/2002 | Oh et al. |
| 6,432,154 B2 | 8/2002 | Oh et al. |
| 6,532,620 B2 | 3/2003 | Oh |
| 7,086,119 B2 | 8/2006 | Go et al. |
| 7,160,346 B2 | 1/2007 | Park |
| 7,941,895 B2 * | 5/2011 | Conrad ........................... 15/353 |
| 8,034,140 B2 * | 10/2011 | Conrad ........................... 55/345 |
| 2009/0181841 A1 * | 7/2009 | Conrad ........................... 494/32 |
| 2009/0205161 A1 * | 8/2009 | Conrad ........................... 15/353 |

FOREIGN PATENT DOCUMENTS

| | | | |
|---|---|---|---|
| CA | 2438079 A1 * | 9/2002 | |
| EP | 0493950 B1 | 4/1998 | |
| EP | 1779761 A2 | 5/2007 | |
| WO | 96/40840 A1 | 12/1996 | |
| WO | 2007021043 A1 | 2/2007 | |
| WO | WO 2009076774 A1 * | 6/2009 | |

OTHER PUBLICATIONS

International Search Report received on the corresponding International Patent Application No. PCT/CA2008/002258, dated Apr. 9, 2009.
Handbook of Air Pollution Prevention and Control, Cheremisinoff, N.P., pp. 397-404, USA, 2002.
International Preliminary Report on Patentability received on the corresponding International Patent No. PCT/CA2008/002258, dated Jun. 6, 2010.

* cited by examiner

*Primary Examiner* — David A Reifsnyder
(74) *Attorney, Agent, or Firm* — Philip C. Mendes da Costa; Bereskin & Parr LLP/S.E.N.C.R.L.,s.r.l.

(57) ABSTRACT

A cyclone separator useable in a surface cleaning apparatus comprises a cyclone casing defining a cyclone chamber and a dirt collection chamber exterior to the cyclone chamber. The cyclone chamber and the dirt collection chamber are openable such that the entire cross sectional area of the cyclone chamber and the dirt collection chamber may be exposed.

27 Claims, 24 Drawing Sheets

CONFIGURATION OF A CYCLONE ASSEMBLY AND SURFACE CLEANING APPARATUS HAVING SAME

FIELD

This invention relates to a cyclone separator. In a preferred embodiment, the invention relates to a cyclonic separator, or a plurality of cyclonic separators in parallel, utilized as a cleaning stage in a surface cleaning apparatus such as a vacuum cleaner.

BACKGROUND

Cyclonic separators, including those used in vacuum cleaners are known in the art. Typically, a cyclonic separator has an inlet for fluid (air, liquid or and air and liquid mix) to be treated and an outlet for treated fluid. Dirt may be collected either in the cyclone chamber itself (e.g. in the bottom) or in a collection chamber in fluid communication with the cyclone separator. Various such constructions are known in the art.

U.S. Pat. No. 7,086,119 (Go et al) discloses a dust-collecting unit for a vacuum cleaner. The dust-collecting unit includes a cyclone separator having a dirt collection chamber positioned adjacent one lateral side of the cyclone separator. A dirt outlet is provided in the upper wall of the cyclone such that dirt may enter the adjacent dirt collection chamber through the outlet in the upper wall of the cyclone separator. A second dirt collection chamber is positioned below the cyclone chamber and is accessed by an opening formed in a separating plate that separates the cyclone chamber and the second dirt collection chamber. An openable bottom is provided. However, when the bottom is opened, the cyclone chamber is still closed by the separating plate.

U.S. Pat. No. 7,160,346 (Park) discloses a cyclone for use in a vacuum cleaner having a dirt collection space positioned below the cyclone chamber. A dirt outlet is provided as an annular gap between the sidewall of the cyclone chamber and a separating plate for permitting dirt to travel downwardly from the cyclone into the dirt collection chamber. Accordingly, the dirt collection chamber is not exterior to the cyclone casing but is within the casing.

SUMMARY

In accordance with this invention, a cyclone separator comprises a cyclone casing defining a cyclone chamber and a dirt collection chamber exterior to the cyclone chamber, wherein both the cyclone chamber and the dirt collection chamber are openable such that the entire cross sectional area of the cyclone chamber and the dirt collection chamber may be exposed. Further, the chambers may be openable such that all interior components, such as a vortex finder, may be removed.

Providing the dirt collection chamber exterior to the cyclone chamber, as opposed to inside the cyclone chamber, can result in increased cyclonic separation efficiency. However, if the cyclone separator assembly is used in a household appliance, such as a vacuum cleaner or air cleaner, from time to time, a consumer will have to empty the interior of both the cyclone chamber and the dirt collection chamber. For example, hair and fluff may become trapped in the cyclone chamber and not be conveyed to the dirt collection chamber. In accordance with this invention, an improved emptying mechanism is provided such that a consumer may open both the dirt collection chamber and the cyclone chamber for emptying.

In accordance with one embodiment of this invention, there is provided a cyclone separator comprising:
(a) a cyclone casing defining a cyclone chamber and having first and second spaced apart portions, a fluid inlet, a fluid outlet, a sidewall and a separated material outlet, the first portion including a first end and the second portion including an opposed second end;
(b) the fluid inlet is provided in the first portion; and,
(c) a separated material collection chamber in communication with the separated material outlet and exterior to the cyclone chamber, the separated material collection chamber has an opposed surface facing the second end and spaced from the second end, and the opposed surface and the second end are each openable.

In any embodiment, the cyclone chamber may be openable concurrently with the separated material collection chamber. For example a joining member extending between the opposed surface and the second end may be provided. An advantage of this embodiment is that both chambers may be opened, and emptied, in a single step.

In any embodiment, each of the second end and the opposed surface may be pivotally mounted and moveable between a closed position and an open position.

In any embodiment, the cyclone chamber may be openable at a position between the first and second ends.

In any embodiment, the separated material outlet may be provided in the second portion of the cyclone casing.

In any embodiment, the opposed surface may be spaced at least about 0.5 inches from the second end.

In any embodiment, a single separated material outlet may be provided.

In any embodiment, the separated material outlet may be positioned from about 90 to about 330, and preferably from about 180 to about 300° around the cyclone casing in a flow direction from the flow inlet.

In any embodiment, the separated material collection chamber may surround at least a portion of the cyclone chamber.

In accordance with a further aspect of this invention, there is provided a cyclone separator comprising:
(a) a cyclone casing defining a cyclone chamber and having first and second spaced apart portions, a fluid inlet, a fluid outlet, a sidewall and a separated material outlet, the first portion including a first end and the second portion including an opposed second end;
(b) the fluid inlet is provided in the first portion;
(c) a separated material collection chamber in communication with the separated material outlet and exterior to the cyclone chamber, the separated material collection chamber having first and second portions, the first portion of the separated material collection chamber located at a same end as the first portion of the cyclone casing; and,
(d) the first portions of the cyclone casing and the separated material collection chamber are each openable.

In any embodiment, the cyclone casing and the separated material collection chamber may be concurrently openable.

In any embodiment, the separated material outlet may be provided in the second portion of the cyclone casing.

In any embodiment, the first portion of the separated material collection chamber may have an end wall and the end wall and the first end of the cyclone casing may be openable. Preferably, the end wall of the separated material collection chamber and the first end of the cyclone casing are of a unitary construction. Alternately, or in addition, the end wall of the separated material collection chamber and the first end of the cyclone casing are preferably pivotally openable.

In any embodiment, the separated material collection chamber may surround at least a portion of the cyclone chamber.

In any embodiment, the separated material collection chamber may have an opposed surface facing the second end of the cyclone casing and spaced from the second end.

In any embodiment, the separated material collection chamber may surround all of the cyclone chamber and the separated material collection chamber has an opposed surface facing the second end of the cyclone casing and spaced from the second end.

In any embodiment, the second portion of the cyclone casing may include a transition member provided adjacent the second end of the cyclone casing, the transition member having an inner surface, at least a portion of which extends in a different orientation to both the sidewall and the second end.

A surface cleaning apparatus comprising the cyclone separator of any embodiment may also be provided. Preferably, the second end is positioned below the first end. Alternately, or in addition, the cyclone separator preferably comprises a second cyclonic cleaning stage of the surface cleaning apparatus. In any embodiment, a plurality of the cyclone separators are connected in parallel to provide the second cyclonic cleaning stage.

Preferably, the cyclone separator is provided with an inwardly directed transition member that extends between the sidewall of the cyclone casing and an end wall of the cyclone casing. The transition member may extend at an angle or may be curved inwardly. If the cyclone separator is oriented in an upright fashion, then the fluid inlet is provided adjacent the upper end of the cyclone and the fluid exit may also be provided adjacent the upper end of the cyclone. Accordingly, the transition member would extend downwardly and inwardly from the sidewall to the lower end wall that is positioned distal to the fluid inlet. It will be appreciated that if the cyclone separator were to be inverted, then the fluid inlet would be positioned on the bottom and the end wall would be positioned above the inlet (e.g., the end wall would be an upper end wall). In such an orientation, the transition member will extend upwardly and inwardly from the sidewall to the end wall. It will also be appreciated that the cyclone separator could also be oriented horizontally, or at any other angle.

Preferably, the separated material outlet is provided adjacent the end wall distal to the fluid inlet and, more preferably, the dirt outlet is provided at least partially in the transition member. Most preferably, the dirt outlet is provided in the transition member.

It will be appreciated by those skilled in the art that the cyclone separator disclosed herein may be utilized with any fluid stream (e.g. liquid and/or gas). In addition, it will be appreciated by those skilled in the art that the cyclone separator may be used in any consumer appliance and, preferably, is utilized in a surface cleaning apparatus or an air cleaner. The surface cleaning apparatus may be a vacuum cleaner, including an upright vacuum cleaner, a stick vacuum cleaner, a canister vacuum cleaner, a back pack vacuum cleaner, a strap carriable vacuum cleaner or a portable vacuum cleaner; a carpet extractor, a bare floor cleaner or the like.

DETAILED DESCRIPTION

Figure 1:
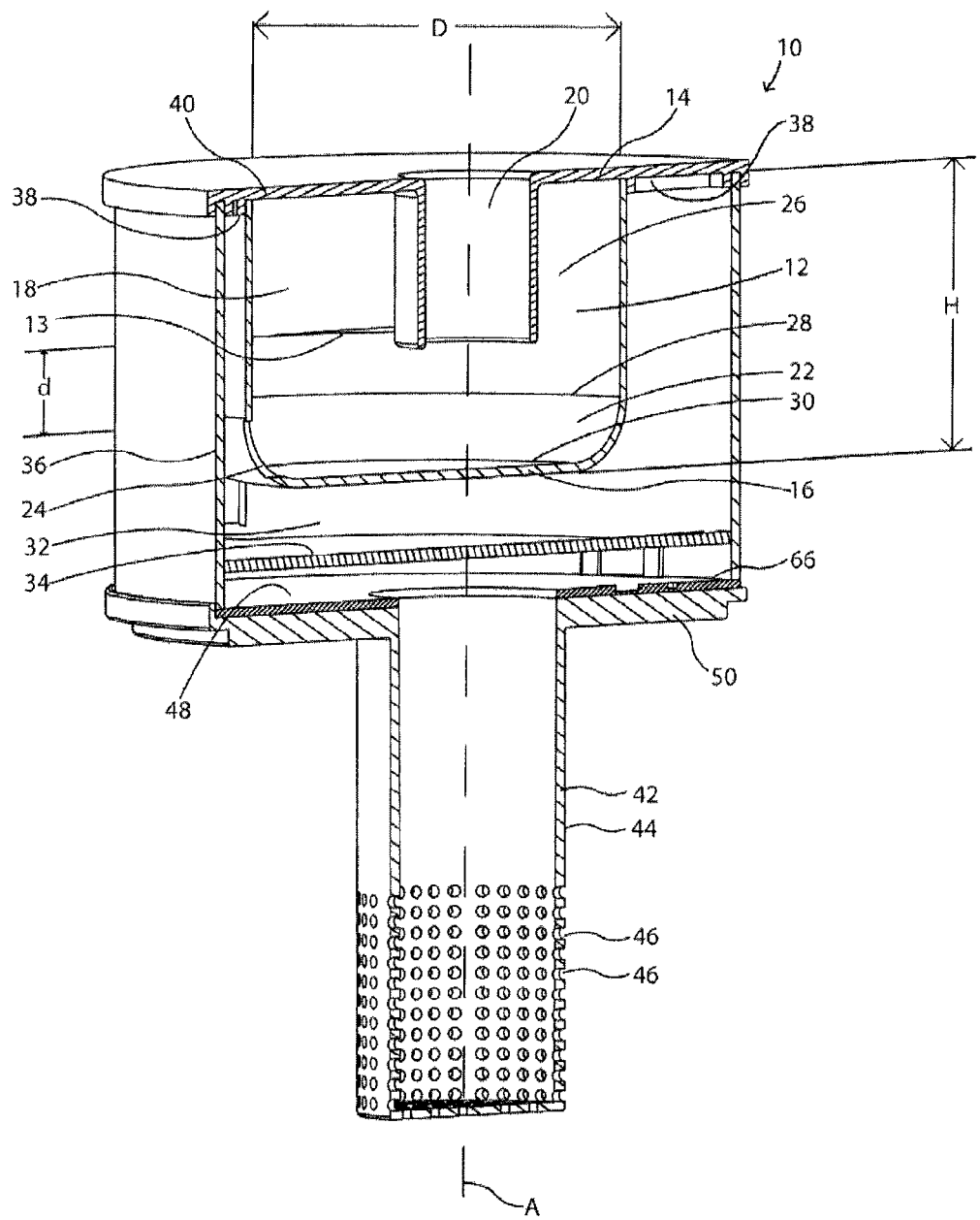
FIG. 1 is a perspective vertical section through a cyclone separator according to a first embodiment of this invention wherein the cyclone separator is oriented in an upright fashion.
Figure 1A:
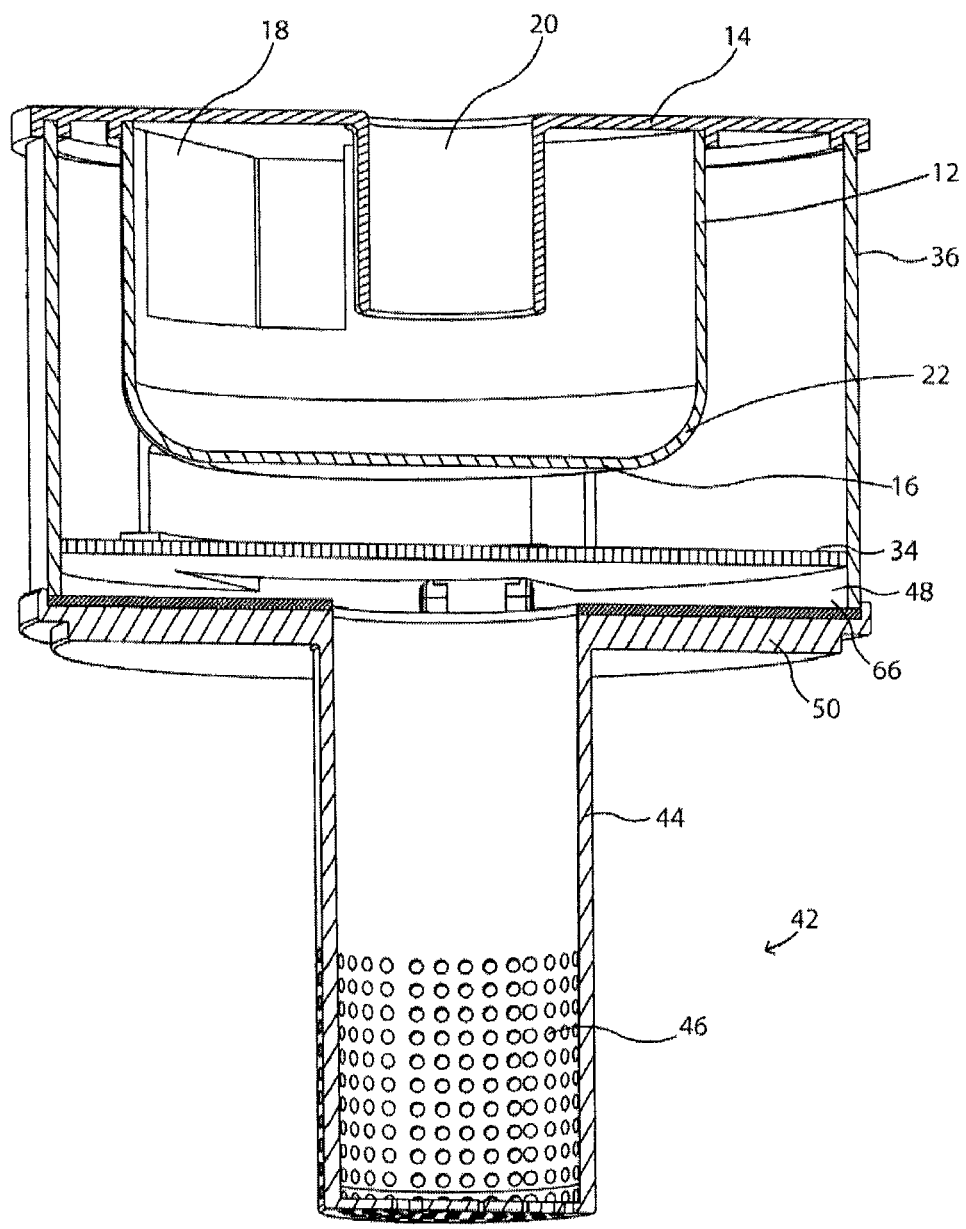
FIG. 1a is a vertical section through the cyclone separator of FIG. 1.
Figure 1B:
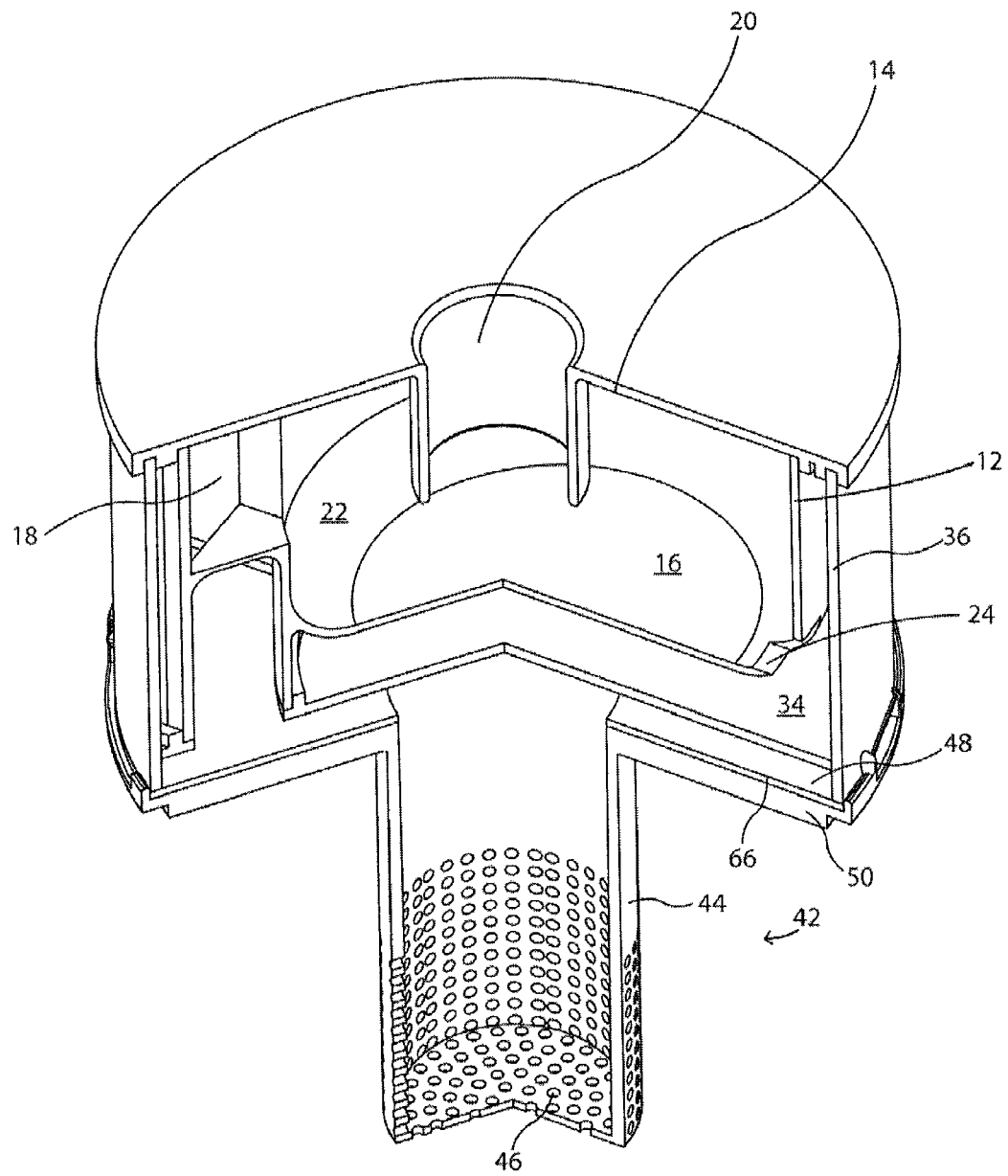
FIG. 1b is a perspective vertical section looking downwardly through the cyclone separator of FIG. 1.

In the following description of the preferred embodiment, the cyclone separator is described as used in a vacuum cleaner of any particular design. As exemplified in FIG. 22, surface cleaning apparatus 120 may be an upright vacuum cleaner having a surface cleaning head 122 and a vacuum cleaner body 124 pivotally mounted thereto. Handle 126 may be provided for moving surface cleaning apparatus 120. Surface cleaning apparatus 120 has a first cyclonic cleaning stage 128 and a second cyclonic cleaning stage 130. However, it will be appreciated that the description set out herein is not confined to such uses as may be used for any other application referred to herein or known in the art.

As exemplified in FIGS. 1-5, a cyclone separator assembly 10 comprises a cyclone casing defining a cyclone chamber 26 and comprising a sidewall 12, air or fluid inlet 18, air or fluid outlet 20, optional transition member 22 and a dirt or separated material outlet 24. The cyclone casing has first and second spaced apart portions. The first portion comprises first end wall 14 and the second portion comprises an opposed second end wall 16. A separated material collection chamber or dirt collection chamber 32 is provided exterior to cyclone chamber 26.

First and second end walls 14 and 16 are spaced apart and are positioned opposite each other. Preferably, as exemplified, air inlet 18 is provided in sidewall 14 and, more preferably, adjacent first or upper end 14. In addition, air outlet 20 is preferably provided in upper first end 14 and, preferably, is centrally located therein. As exemplified in FIG. 14, the lower end of outlet 20 is preferably positioned above the top of dirt outlet 24. Accordingly, as exemplified in a vertical orientation in FIG. 2, air entering the cyclone casing will travel in a cyclonic fashion downwardly towards second lower end wall 16. Heavier material, e.g. particulate material, will exit cyclone chamber 26 via dirt outlet 24. The air at some point reverses direction and travels upwardly through outlet 20 to exit cyclone chamber 26.

As shown in FIG. 1, sidewalls 18 preferably extend linearly (i.e. it is straight) and, in the orientation shown in FIG. 1, vertically. Preferably, sidewall 18 meets upper end wall 14 at about 90° such that upper first end wall 14 is essentially perpendicular to sidewall 18. In addition, lower second end wall 16 is preferably parallel to first end wall 14. Accordingly, but for transition member 22, the cyclone casing is exemplified as being cylindrical. It will be appreciated that while cyclone separator 10 is preferably generally cylindrical, it may have other shapes. For example, it may be frustoconical as is also known in the art. In addition, air inlet 18 and air outlet 20 may be of any construction and positioning known in the art.

Transition member 12 is provided adjacent lower end wall 16 and preferable is immediately adjacent lower end wall 16. Accordingly, transition member 22 may link sidewall 18 and lower end wall 16. For example, as exemplified in FIG. 1, transition member 22 extends between lower end 28 of sidewall 18 and outer end 30 of lower end wall 16. If the cyclone separator is oriented as shown in FIG. 1 (it is in an upright orientation), then transition member 22 extends downwardly and inwardly.

It will be appreciated that transition member 22 may have a variety of configurations. For example, transition member 22 may be a single surface that extends at an angle from lower end 28 of sidewall 18 to outer end 30 of lower end wall 16 (see for example FIGS. 15 and 16). As exemplified, sidewall 18 extends between the first end 14 and transition member 22 in a first direction (vertically), second end 16 extends in a second direction (horizontally), and transition member 22 extends in at least one third direction from sidewall 18 to the second end 16. Accordingly, it will be appreciated that the transition member extends in a third direction (other than the direction of sidewall 18 and the direction of end wall 16). Accordingly, transition member 22 may be at an angle to the longitudinal axis of sidewall 18, at an angle to the longitudinal axis A of the cyclone separator itself and at an angle to the plane of lower end 16 (the horizontal plane as exemplified in FIGS. 15 and 16).

Alternately, a plurality of angled surfaces may be provided. Alternately, and preferably, transition member 22 may be curved and, more preferably, is radiused. In a particularly preferred embodiment, transition member 22 describes part of an arc of a circle which may have a radius from 0.125 inches to 2 inches, more preferably from 0.25 to 1 inch, even more preferably from about 0.375 to 0.75 inches and most preferably about 0.5 inches.

Figure 17:
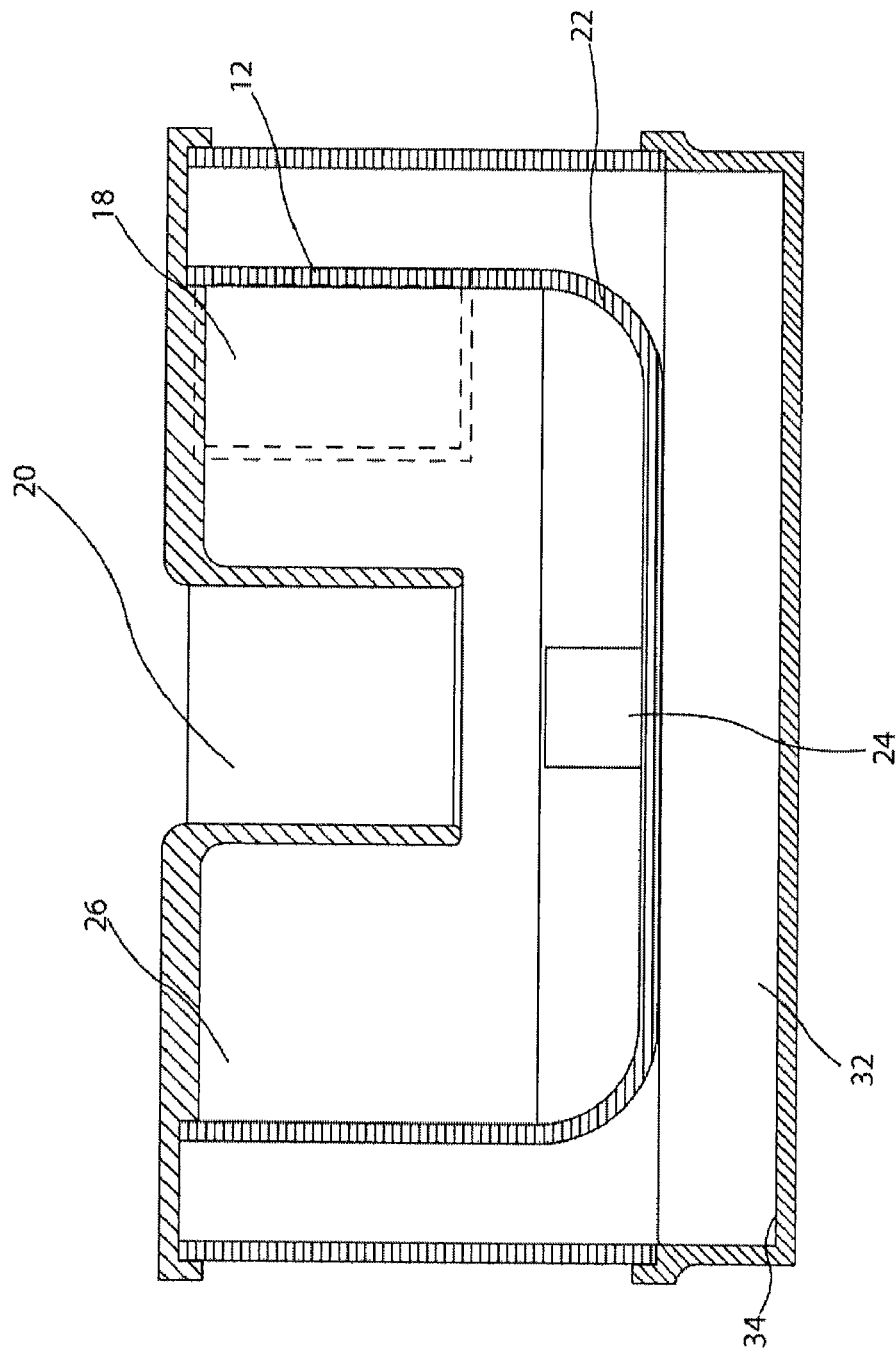
FIG. 17 is a front view of a vertical section of a cyclonic cleaning stage according to a sixth embodiment of this invention wherein the transition member is rounded, the cyclonic cleaning stage comprises a single cyclone and the separated material outlet extends above the transition member and is positioned about 270° around the cyclone casing in a flow direction from the fluid inlet.

Preferably, dirt outlet 24 is provided in a lower portion of the cyclone separator. Preferably, if transition member 22 is provided, at least a portion of dirt outlet 24 is provided in transition member 22. For example, as exemplified in FIGS. 17 and 18, dirt outlet 24 may extend above transition member 22. Preferably, as exemplified in FIG. 1, dirt outlet 24 is positioned completely within transition member 22. For example, as exemplified in FIG. 14, dirt outlet 24 extends to the juncture of transition member 22 and sidewall 18. Alternately, as exemplified in FIG. 15, dirt outlet 24 may terminate at a position below the juncture of transition member 22 and sidewall 18.

Figure 12:
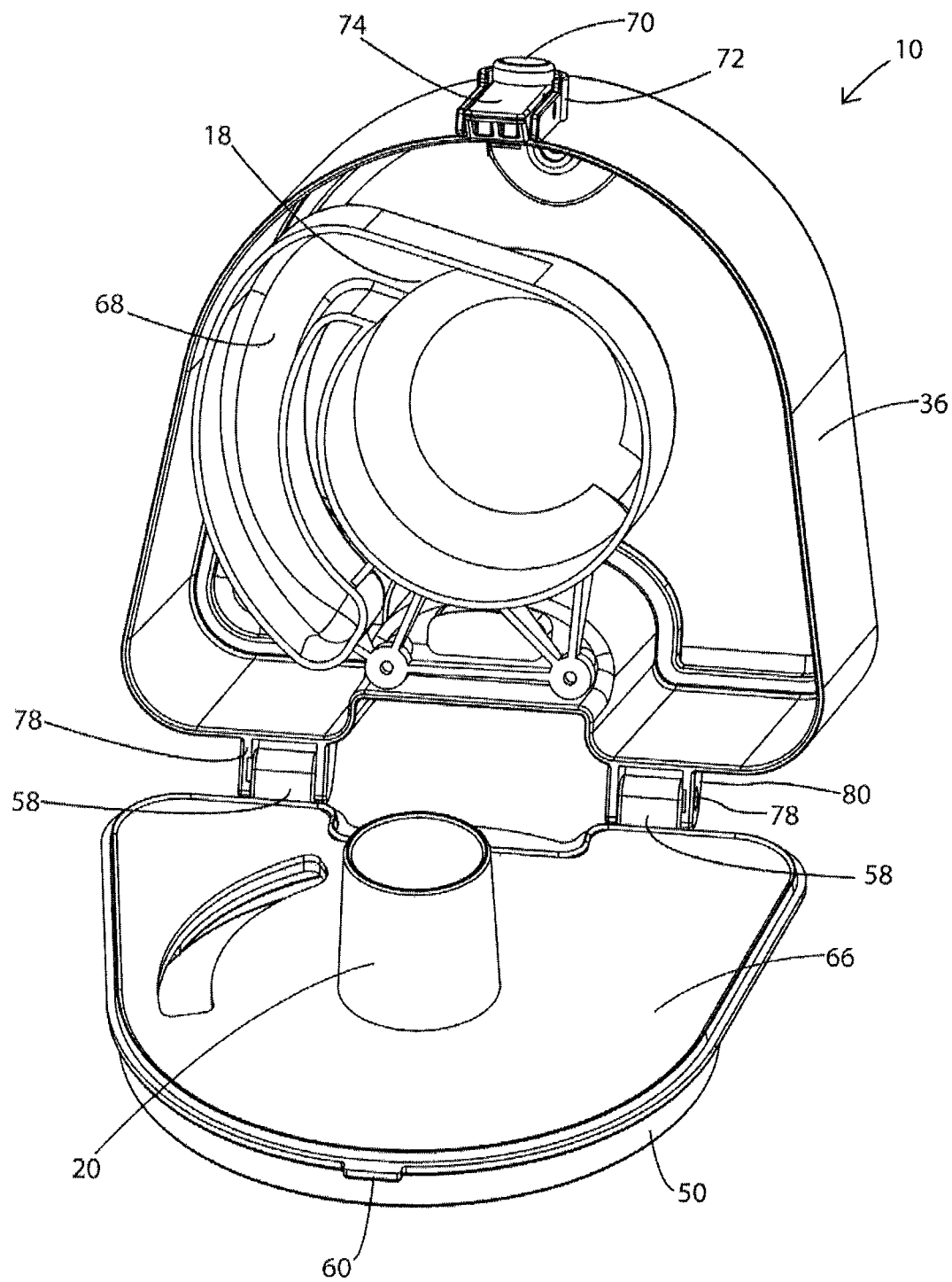
FIG. 12 is an end view of the opened cyclone separator shown in FIG. 11.
Figure 18:
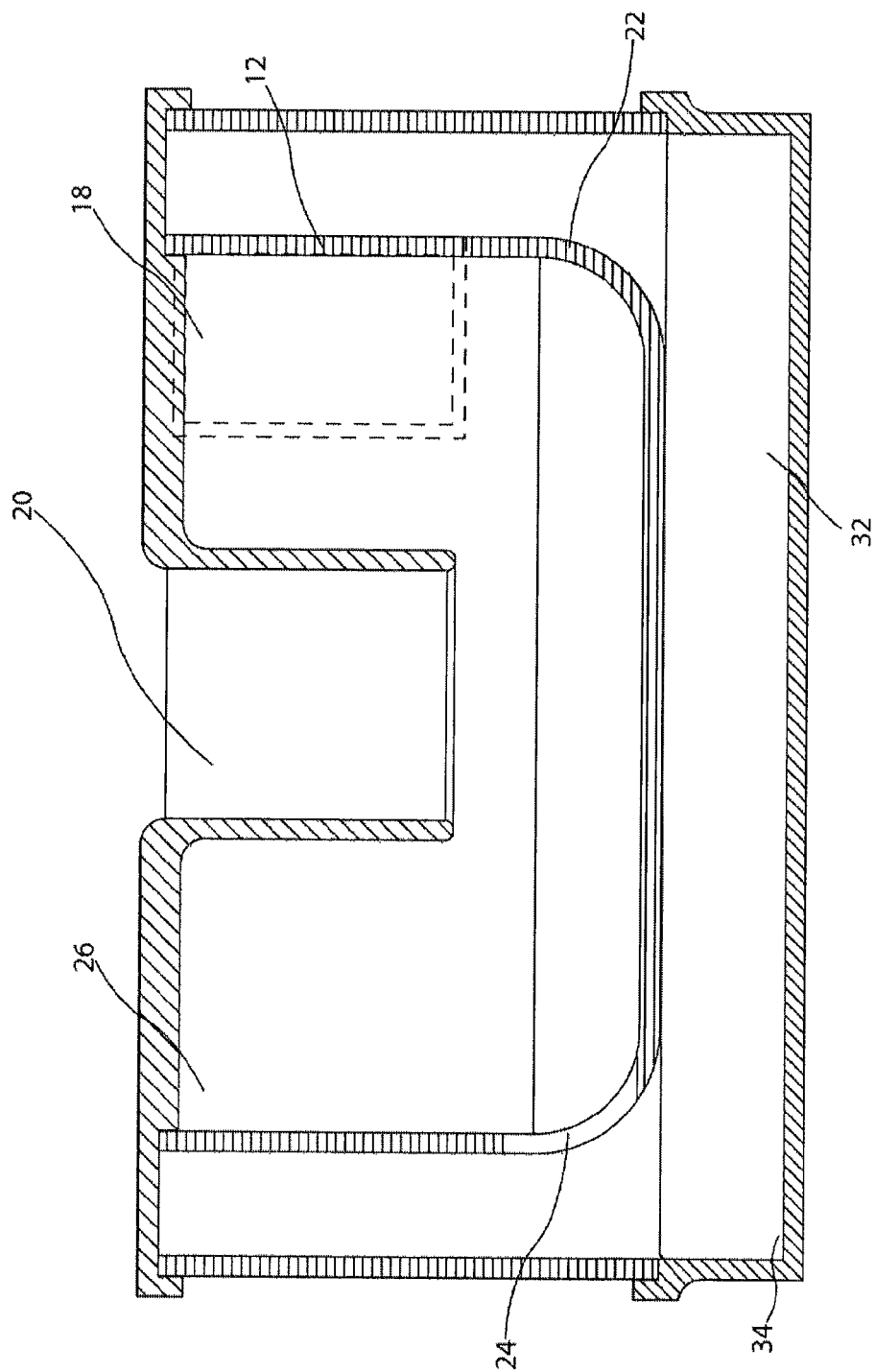
FIG. 18 is a front view of a vertical section of a cyclonic cleaning stage according to an seventh embodiment of this invention wherein the transition member is rounded, the cyclonic cleaning stage comprises a single cyclone and the separated material outlet extends above the transition member and is positioned opposed to the air inlet.

One or more dirt outlets 24 may be provided for a single cyclone chamber 26. Preferably, a single dirt outlet 24 is provided, as exemplified in FIG. 1. The one or more dirt outlets 24 may be positioned at any angular displacement B with respect to inlet 18 (see for example FIG. 21). Dirt outlet may be displaced from about 90 to about 330 degrees, preferably from about 180 to about 300 degrees, more preferably from about 240 to about 300 degrees and most preferably about 270 degrees in the flow direction from air inlet 18. For example, as shown in FIGS. 12 and 18, dirt outlet 24 may be displaced about 180 degrees in the flow direction around cyclone chamber 26 from inlet 18 (i.e., dirt outlet 24 is generally opposed to air inlet 18). Alternately, as exemplified in FIG. 17, dirt outlet may be displaced about 90 degrees in the flow direction around cyclone chamber 26 from inlet 18. It is preferred that outlet 24 having such an angular positioning is provided in a lower portion of the cyclone casing as discussed herein.

As shown in FIG. 1, the cyclone chamber has a height H (i.e., the distance between first and second opposed end walls 14 and 16) and a diameter D (i.e. the diameter of sidewall 12). Accordingly, height H is the combined height of sidewall 18 and transition member 22. In a broad aspect of this invention, height H and diameter D may be any of those known in the art. Preferably, height H is less than diameter D and, more preferably, height H is less than half of the diameter D.

It will be appreciated that transition member 22 may have any desired length. Accordingly, transition member 22 may extend from end wall 16 to inlet 18. However, it is preferred that a portion of sidewall 12 is provided between inlet 18 and transition member 24. For example, as shown in FIG. 1, sidewall 12 has a portion having a distance d that extends from bottom 13 of inlet 18 to lower end 28 of sidewall 18. Preferably, this section of sidewall is straight and, more preferably parallel to axis A (e.g., vertical as exemplified in FIG. 1 wherein the cyclone separator is oriented with the longitudinal axis A of the cyclone extending vertically). In particular, it is preferred that the section of sidewall having a length d is parallel to the longitudinal axis A of cyclone chamber 26. Lower end 13 of inlet 12 is preferably closer to second lower end 16 than first upper end 14. Accordingly, distance d may be less than the vertical height of the inlet 12.

Figure 8:
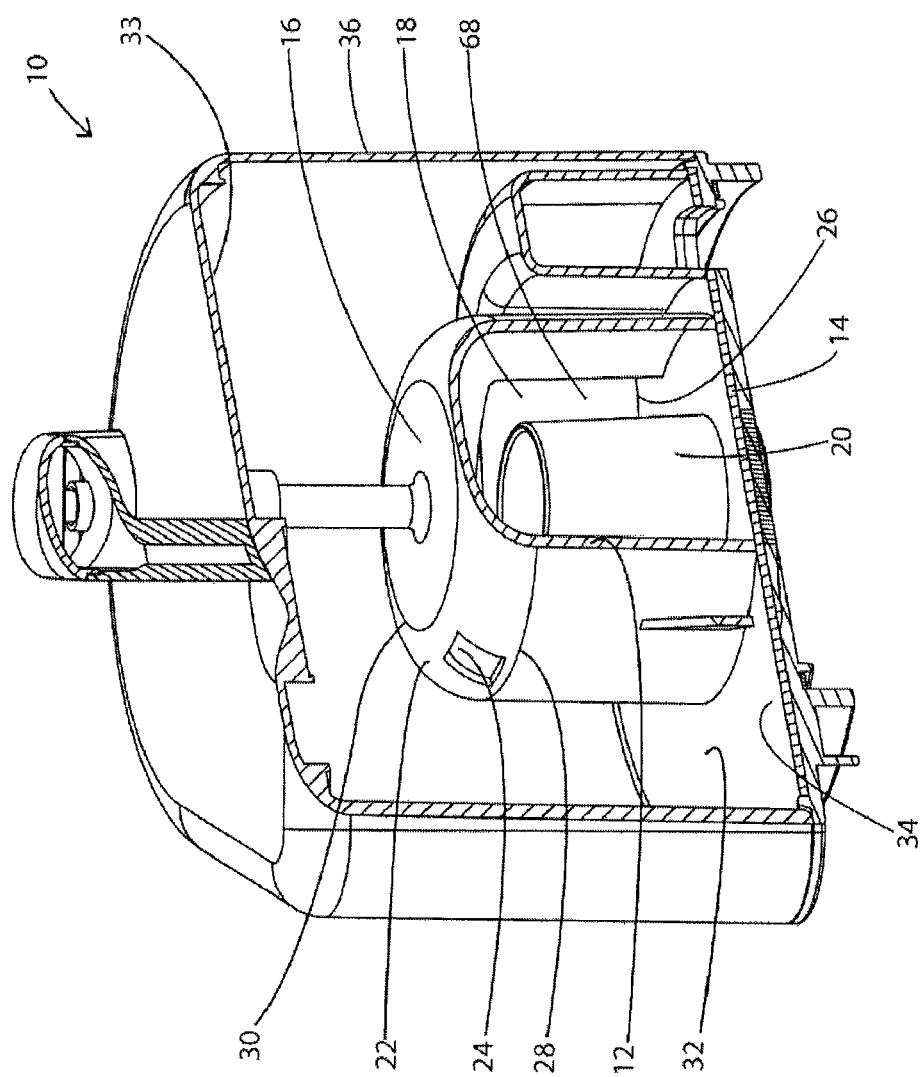
FIG. 8 is a vertical section through a cyclone separator according to a second embodiment of this invention wherein the cyclone separator is inverted.

Dirt collection chamber or separated material collection chamber 32 is positioned in fluid flow communication with dirt outlet 24 and exterior to cyclone chamber 26. Dirt outlet 24 is exemplified as a lateral outlet, i.e., the outlet is provided in sidewall 18 or transition member 22 so that the separated material travels at least partially laterally as it exits cyclone chamber 26. In the embodiment of FIG. 8 wherein the cyclone is inverted, the upper end (second end 16) may be open. In such a case, the open end would function as the dirt outlet.

Figure 2:
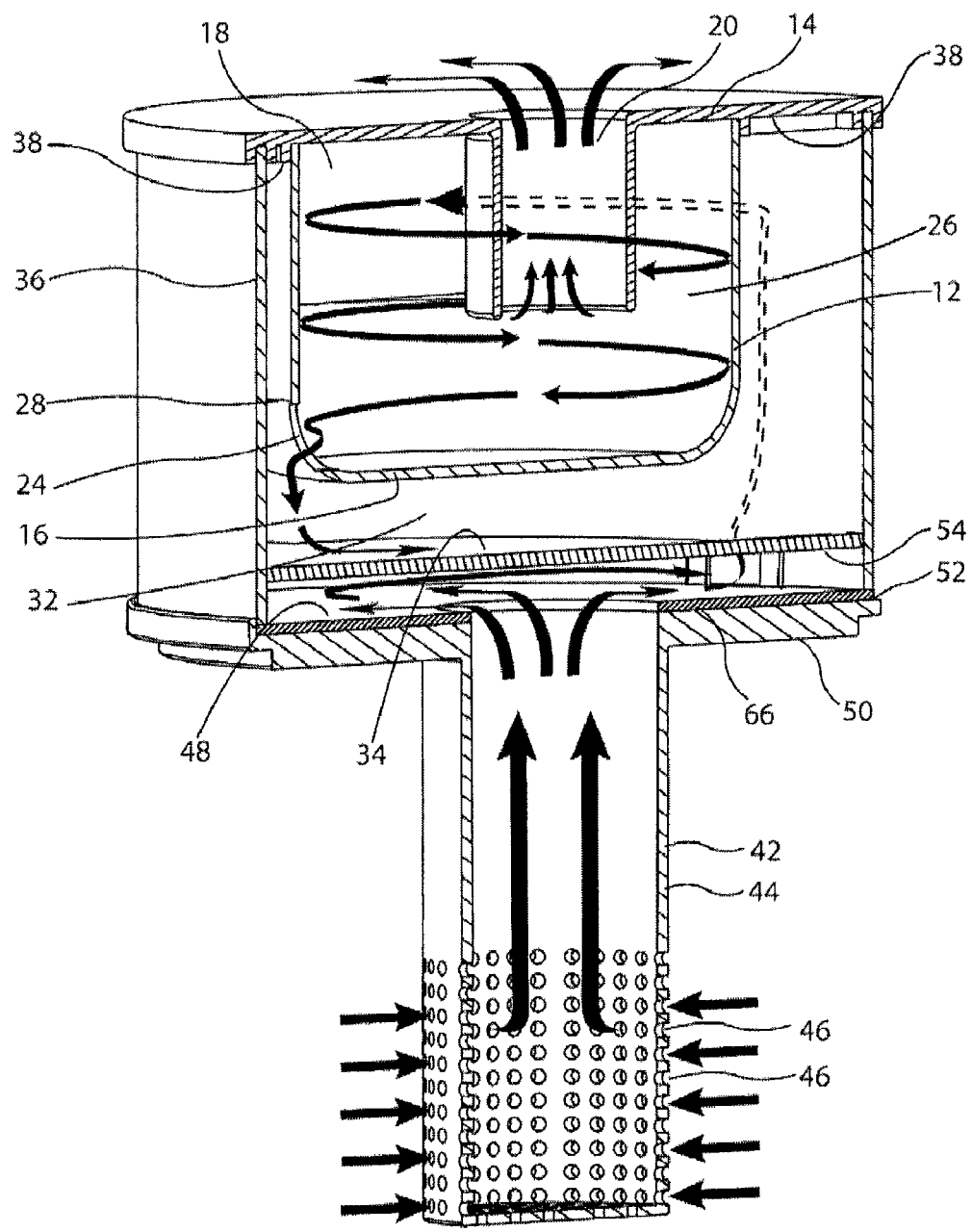
FIG. 2 is a vertical perspective view as shown in FIG. 1 including the air flow and dirt flow path through the cyclone separator.
Figure 3:
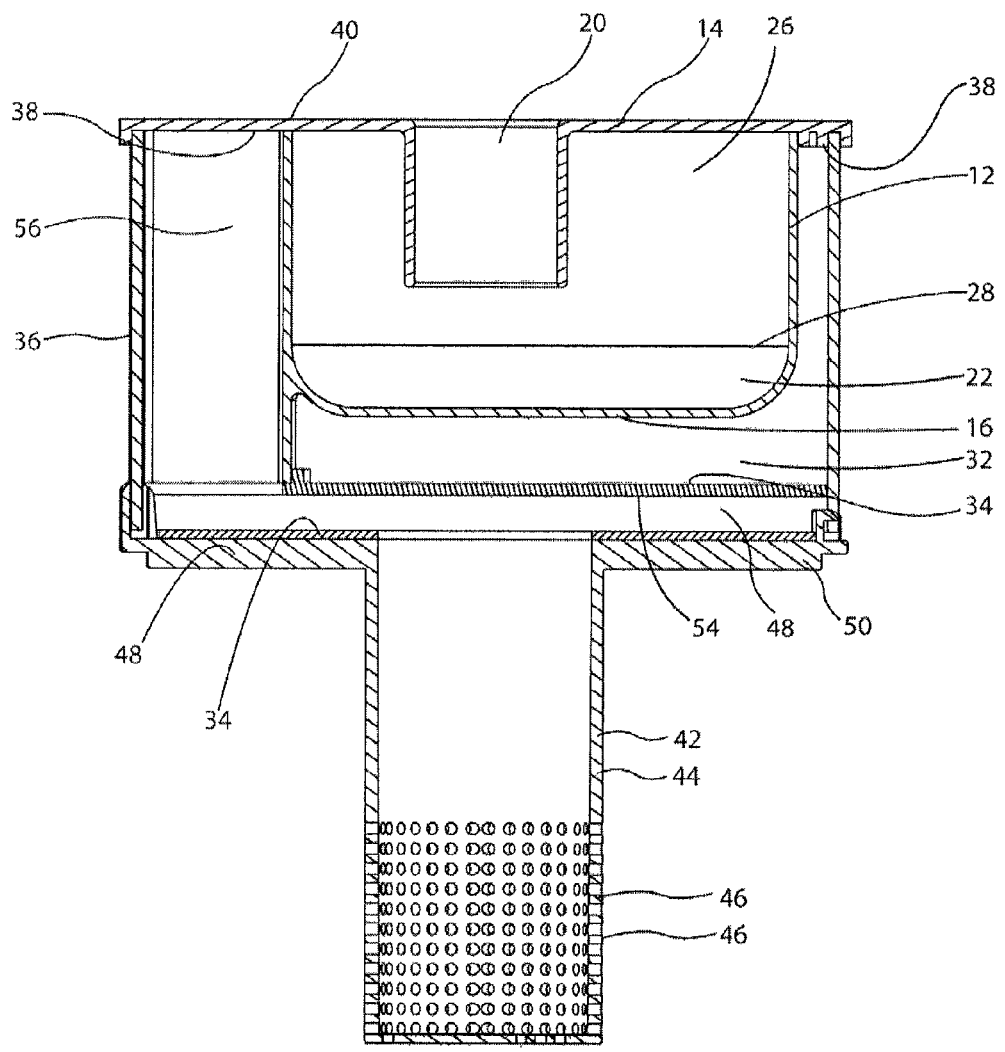
FIG. 3 is a side view of the vertical section of FIG. 1.

Dirt collection chamber 32 may be of any shape. As shown in FIG. 2, dirt or other heavy material will exit cyclone chamber 26 laterally via outlet 24 and then travel downwardly to accumulate on collection surface 34. As exemplified, dirt collection chamber 32 has a collection surface 34, sidewall 36 and a top wall 38.

Dirt collection chamber 32 may surround at least a portion of the cyclone casing. Preferably, dirt collection chamber 32 surrounds the portions of the sidewall of the cyclone casing that are not provided with inlet 18. Alternately, as exemplified in FIG. 21, it may surround all of sidewall 12. The sidewalls of the cyclone casing and the collection chamber may be spaced apart so as to define a gap, that may be an annular gap G if it fully surrounds the cyclone casing, that has a width D. Accordingly, the cyclone casing may be positioned fully within dirt collection chamber 32 as exemplified in FIG. 1.

In addition, the surface of collection chamber 32 opposed to and facing second end 16 (collection surface 34 in the cyclone is oriented upright and opposed surface 33 if the cyclone is inverted) may be spaced from end 16 of the cyclone casing. Preferably, collection surface 34 is an opposed surface facing the second end 16 and spaced from the second lower end 16 by at least about 0.5 inches.

Preferably, sidewall 12 may have an inlet section and a second section, and fluid inlet 18 is provided on the inlet section and the portion of sidewall 36 of separated material collection chamber 32 facing the second section of sidewall 12 of the cyclone casing is spaced apart by at least about 0.5 inches. As exemplified a gap having a width $D_{g1}$ may be provided around the second section of sidewall 12. Distance $D_{g1}$ is at least 0.5 inches. It will be appreciated that the annular gap $D_{g1}$ may be larger and need not have a uniform width. Further, a gap having a width $D_{g2}$ may be provided around the inlet section of sidewall 12. It will be appreciated that width $D_{g2}$ may be less than 0.5 and may be zero such that wall 69 of passage 68 merges with sidewall 36 of collection chamber 32 (see for example the embodiment of FIG. 14).

Figure 21:
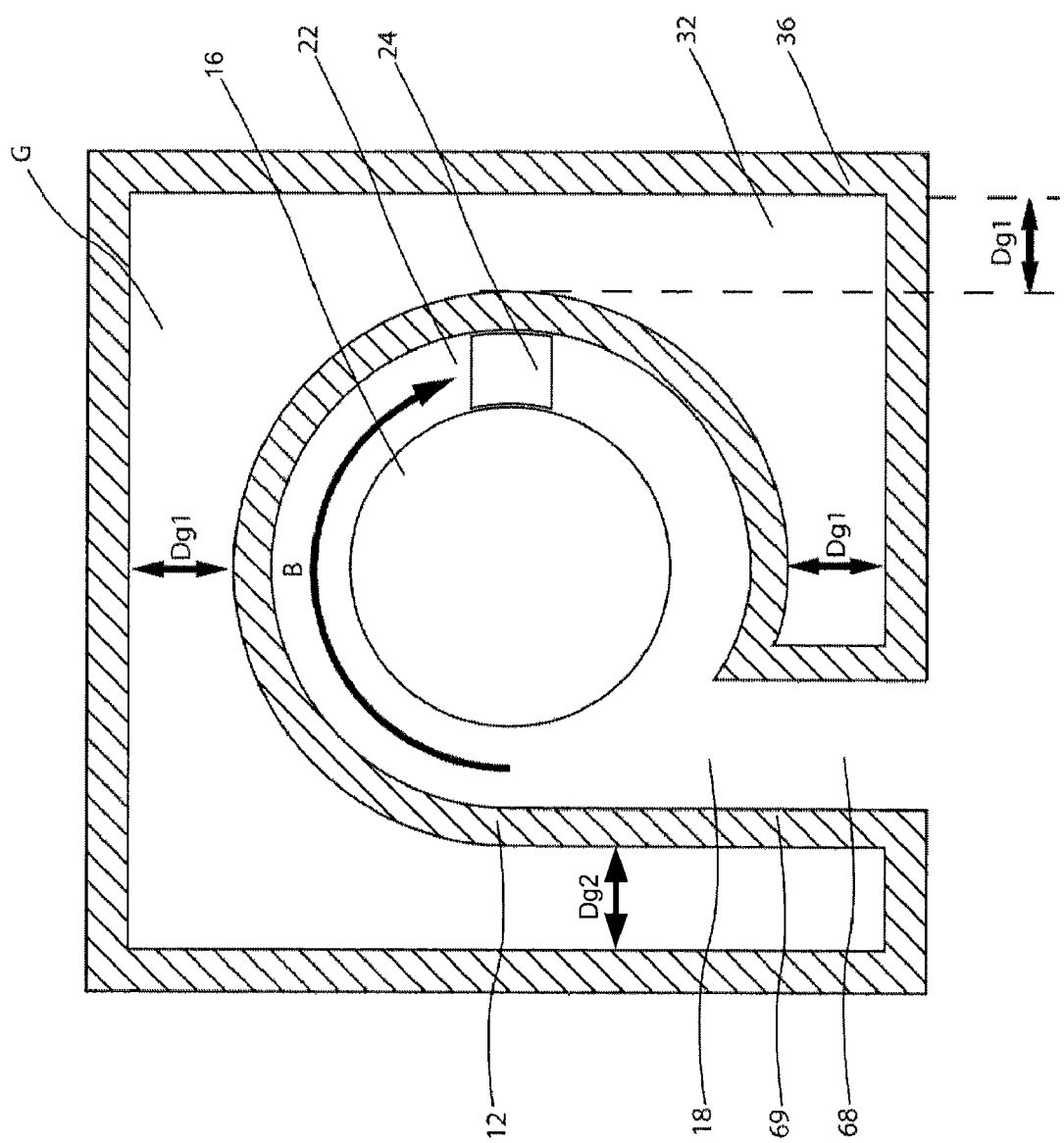
FIG. 21 is a top plan view of a cyclone chamber and a dirt collection chamber according to a ninth embodiment of this invention; and, FIG. 22 is a perspective view of a surface cleaning apparatus utilizing a cyclone separator assembly as setout herein

It will be appreciated that if the cyclone casing is positioned completely within dirt collection chamber 32 (i.e. dirt collection chamber 32 extends completely around the cyclone separator as exemplified in FIG. 21) then, top wall 38 of dirt collection chamber 32 may be annular in shape (i.e., extend between sidewall 12 of the cyclone and sidewall 36 of the dirt collection chamber 32).

Figure 4:
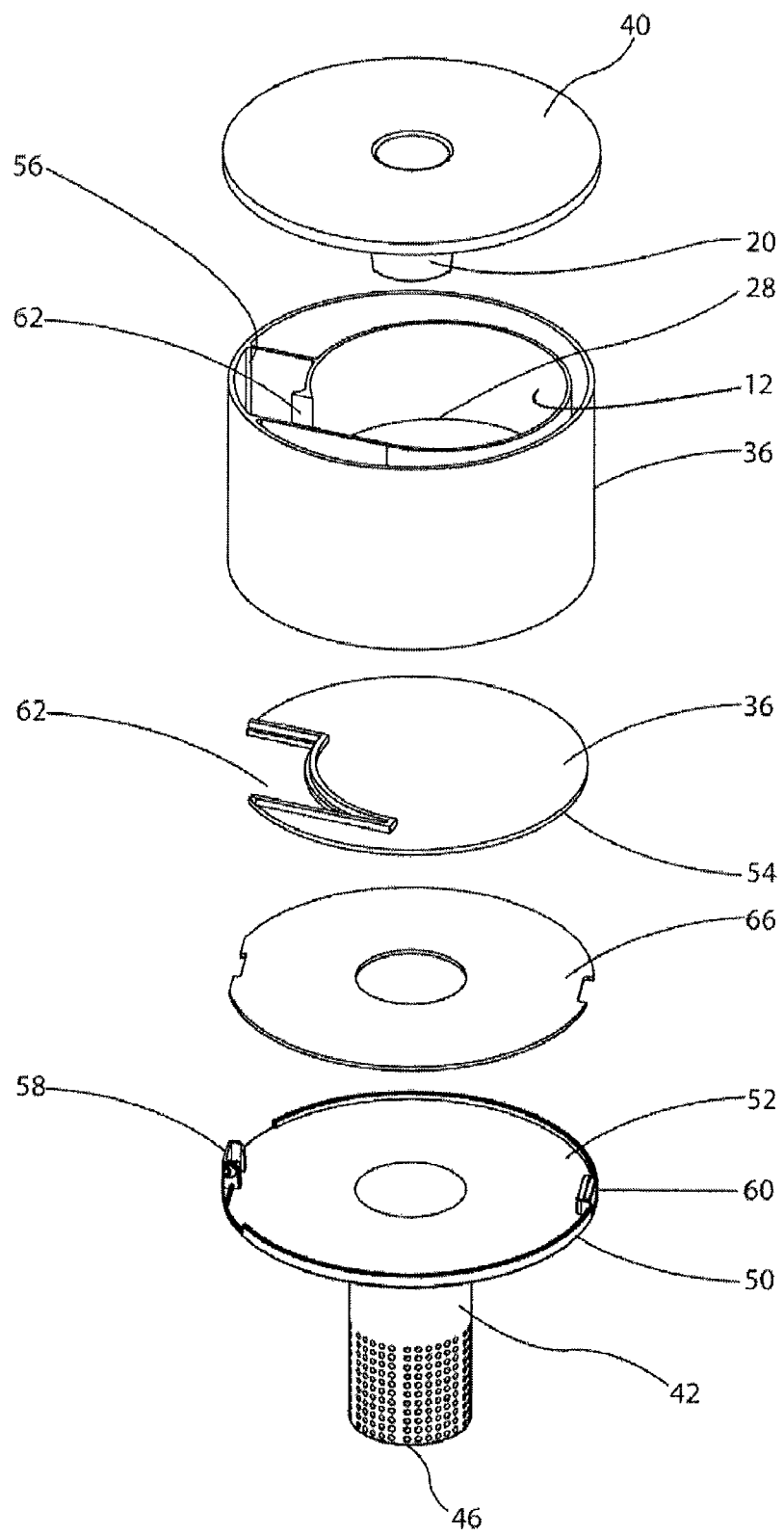
FIG. 4 is an exploded view of the cyclone separator of FIG. 1.
Figure 5:
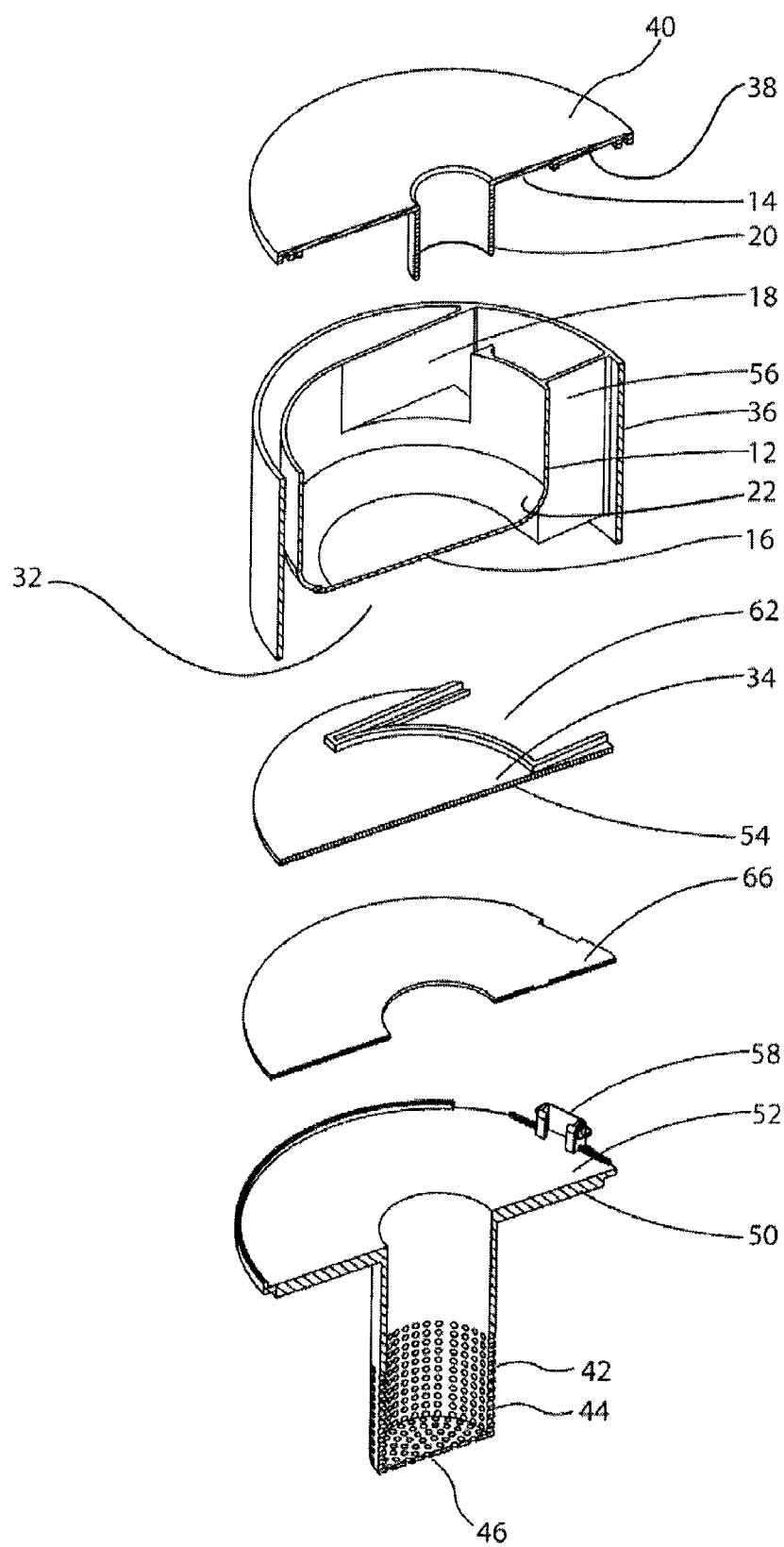
FIG. 5 is a vertical section through the exploded view of FIG. 4.

As exemplified in FIG. 4, top wall 38 of dirt collection chamber 32 and upper first end wall 14 of cyclone chamber 36 may be connected together and are preferably integrally molded as a continuous plate 40. Preferably, air outlet 24 may be provided as part of plate 40 and may be integrally molded therewith.

Figure 22:
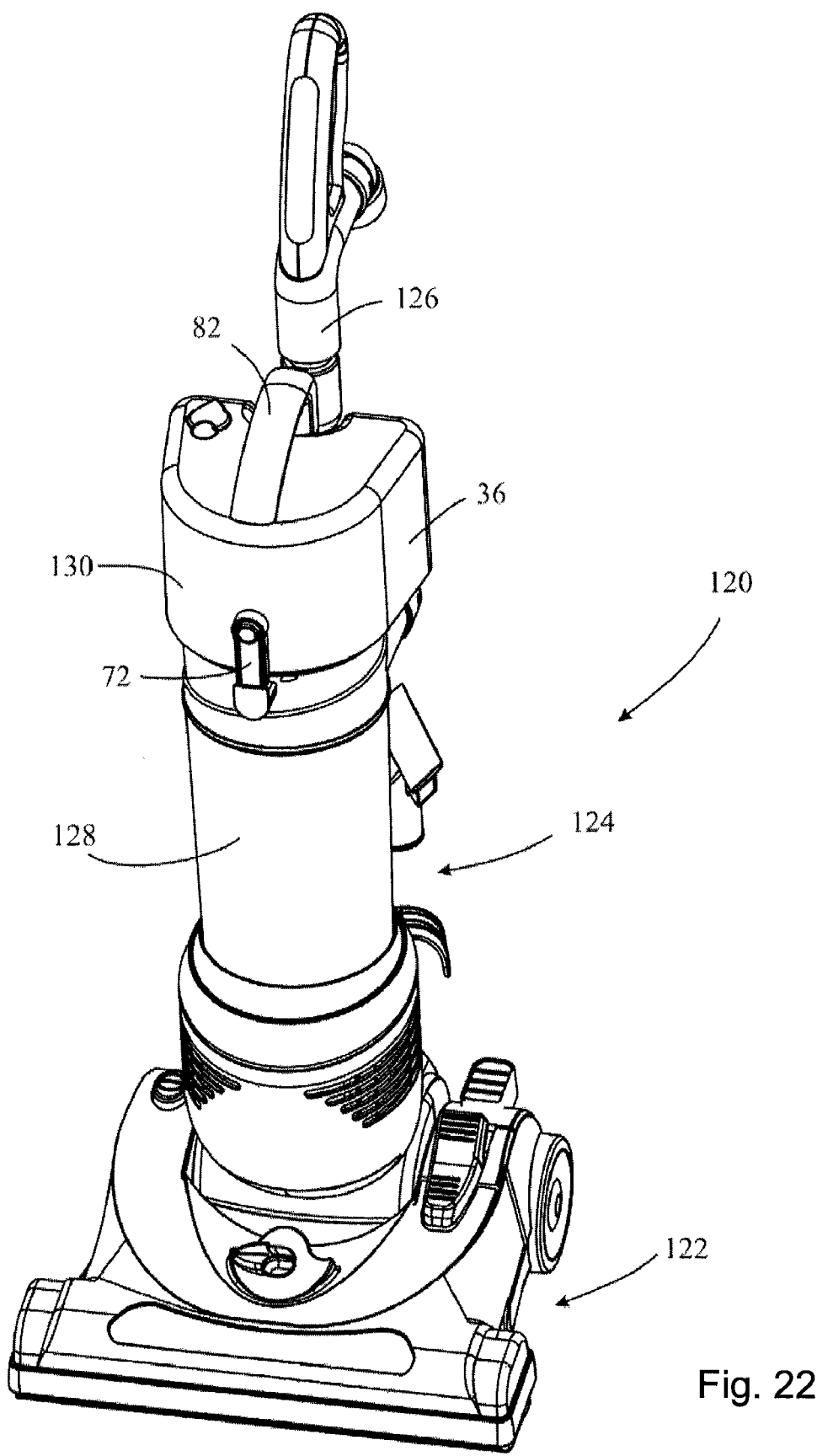

As exemplified in FIGS. 1 and 22, cyclone separator assembly 10 may be provided as a second cyclonic stage 130. Accordingly, cyclone separator assembly 10 preferably has provided as part thereof the air outlet or vortex finder 42 of an upstream cyclonic stage 128 (which is preferably a single cyclone but, as will be appreciated, could be a plurality of cyclones in parallel wherein the vortex finder of each is secured to, and removable with, cyclone separator assembly 10). Preferably, outlet 42 comprises a tubular member having sidewalls 44 wherein apertures 46 may be provided in a lower end thereof. Alternately, it will be appreciated that any air outlet or vortex finder of a cyclone known in the art may be utilized, and need not be provided as part of cyclone separator assembly 10. Vortex finder 42 is preferably attached to the bottom of cyclone separator assembly 10, e.g., bottom panel 50, and may be molded as part of bottom panel 50.

If the cyclone is downstream from another filtration member or air treatment member, then air inlet 18 may be in airflow communication therewith by any means known in the art. In a particularly preferred embodiment as illustrated in FIGS. 1-5, cyclone separator assembly 10 may incorporate an airflow passage from an upstream filtration stage to inlet 18. As illustrated therein, outlet 42 is in airflow communication with header 48. Header 48 is positioned between bottom panel 50 having an upper surface 52 and a lower surface 54 of collection surface 34.

If bottom panel 50 is openably, then in order to provide an airtight seal for bottom panel 50, a sealing gasket 66, O-ring or other sealing member known in the art may be provided. Gasket 66 may be mounted to, or removably mounted to, pivoting bottom 50. In such a case, header 48 maybe positioned between gasket 66 and lower surface 54 of collection surface 34. From header 48, the air travels upwardly trough side air passage 56 (see FIGS. 3, 4 and 5). It will be appreciated that air passage 56 may be of any configuration known in the art. The airflow path is exemplified in FIG. 2.

Figure 7:
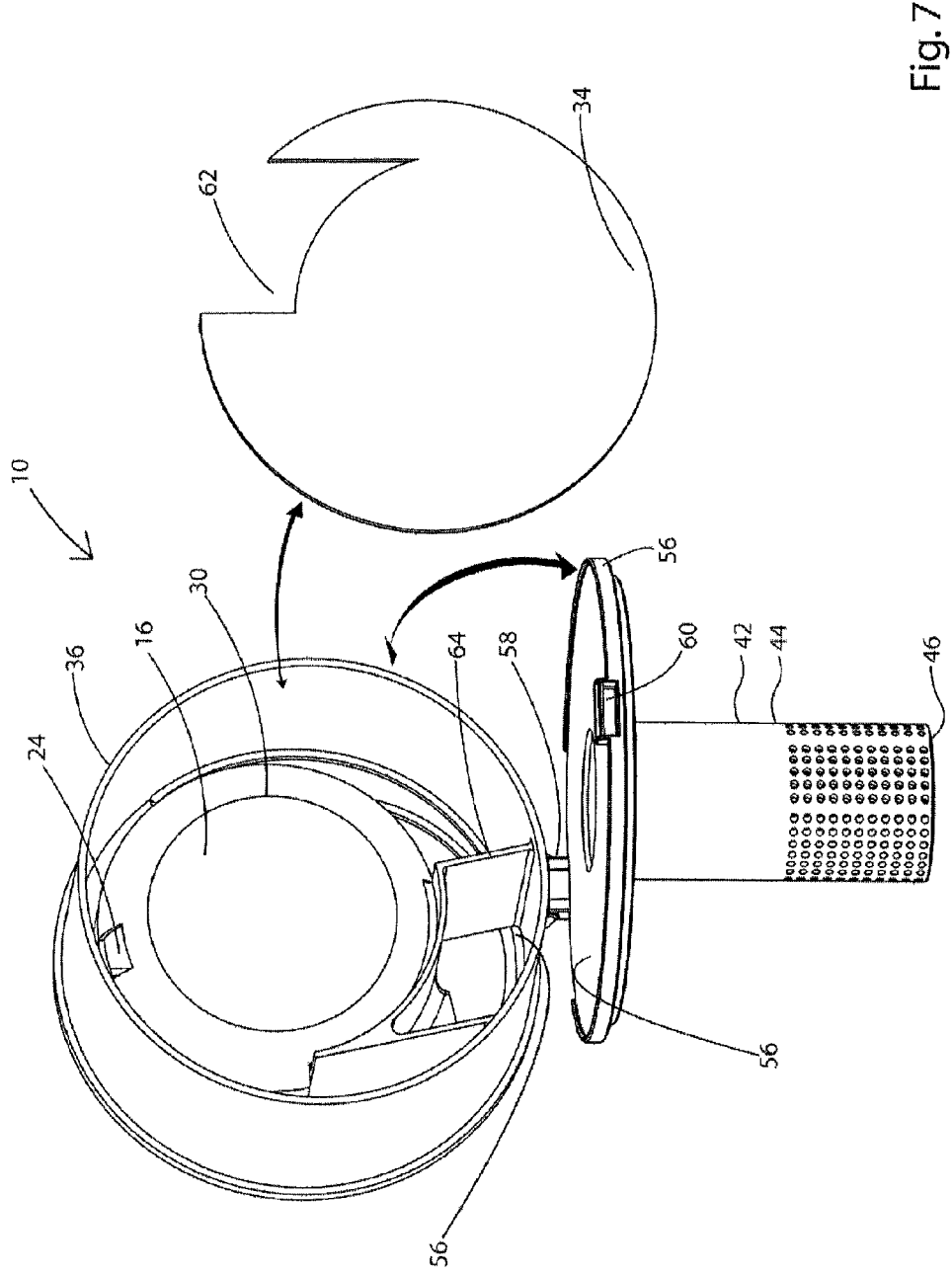
FIG. 7 is an end view of the opened cyclone separator shown in FIG. 6.

In order to permit dirt collection chamber 32 to be emptied, bottom panel 50 may be pivotally attached to cyclone separator assembly 10. For example, flange 58 may be provided on bottom panel 50. A mating flange may be affixed to sidewall 36 (see FIG. 7). The flanges may be pivotally connected by any means known in the art. A latch may be provided on sidewall 36, which engages flange 60, which is provided on bottom panel 50. Accordingly, when in the closed position (shown in FIG. 1), the latch may engage flange 60, thereby securing bottom panel 50 in position. When released, bottom panel 50 may pivot to an open position (as shown in FIG. 7) permitting dirt collected in collection chamber 32 to be emptied. In such a case, a sealing gasket 66 or the like is preferably provided, e.g., mounted to upper surface 52 of panel 50, so as to open with panel 50. Any sealing member known in the art may be used.

Figure 6:
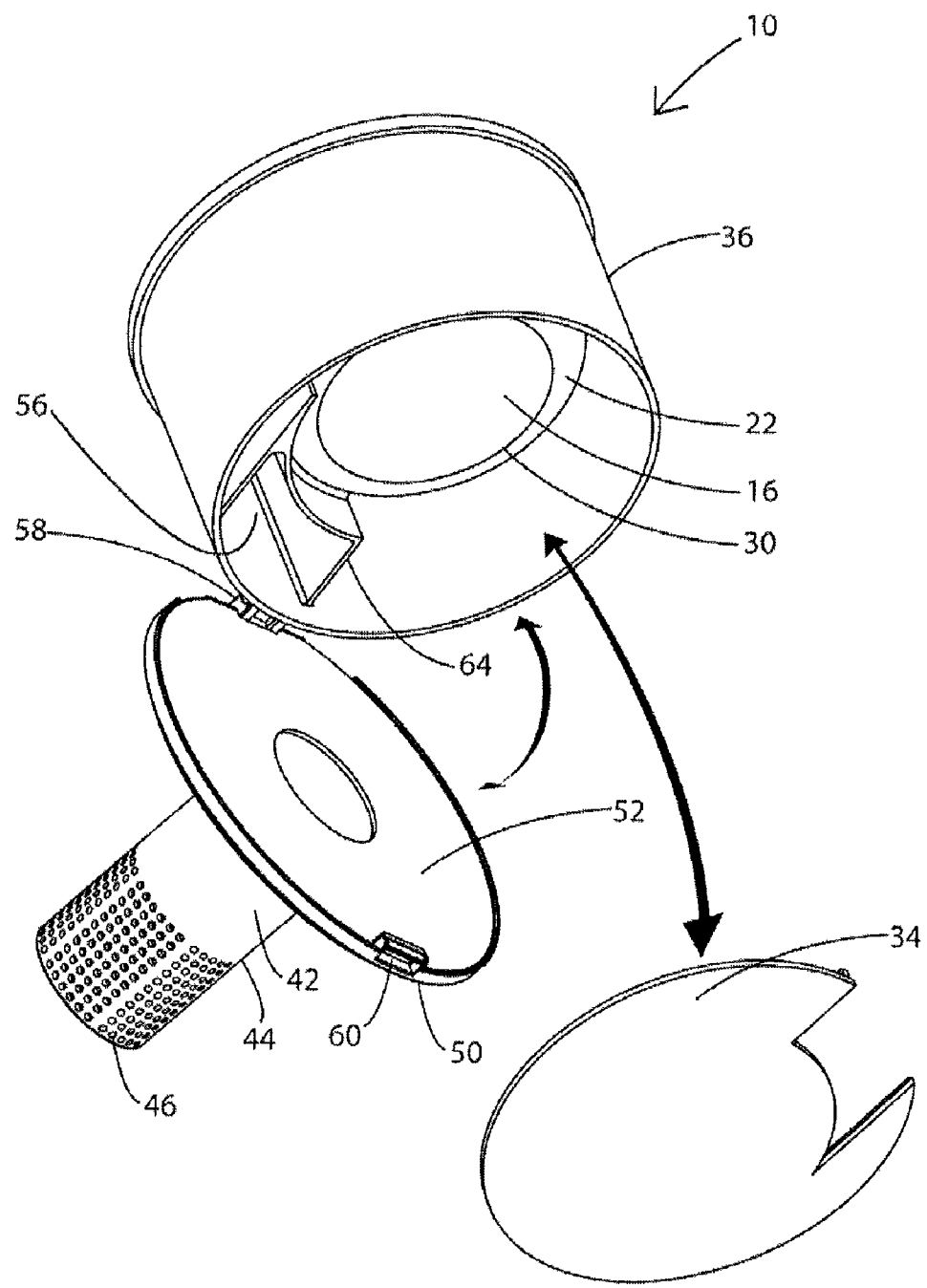
FIG. 6 is a perspective view showing an optional embodiment that permits the cyclone separator to be opened to permit emptying.
Figure 9:
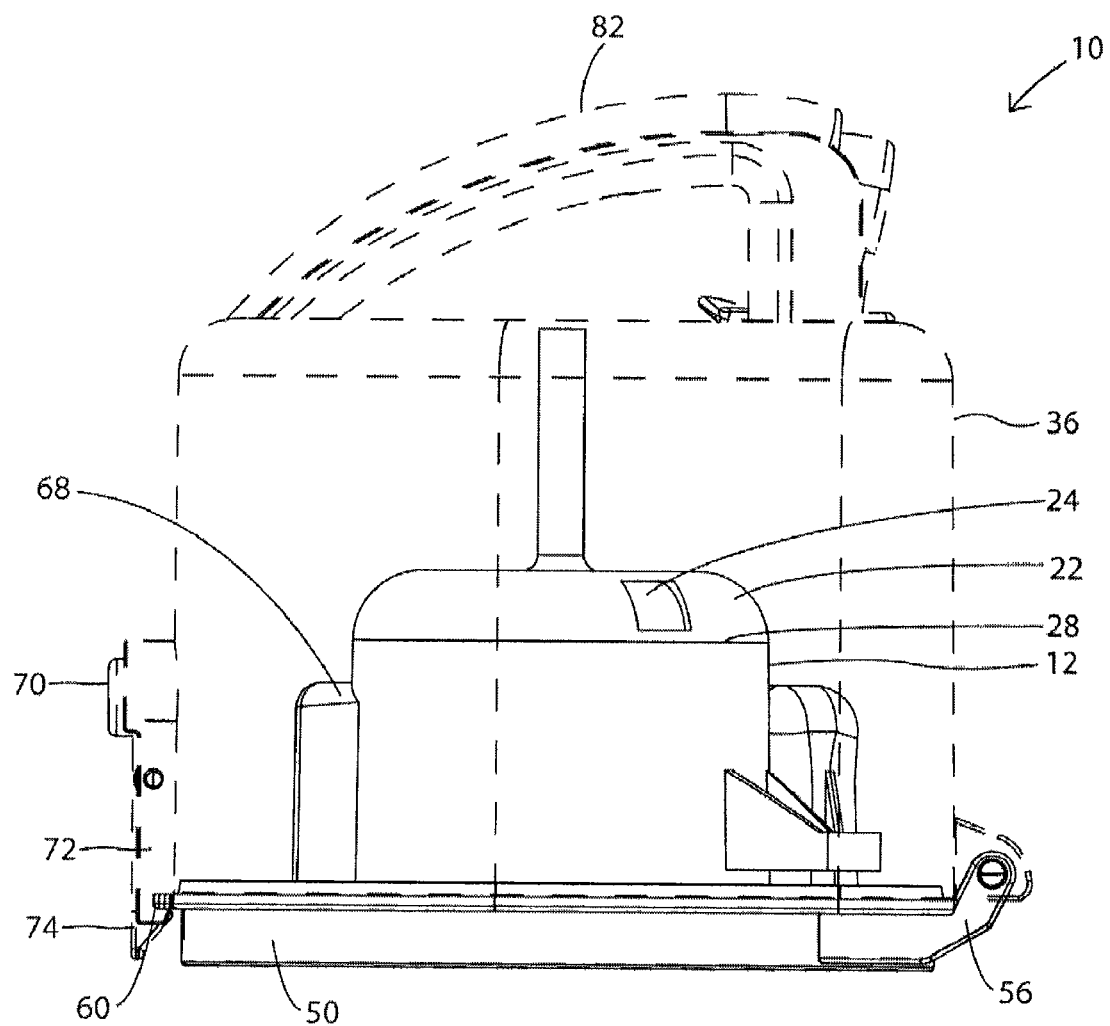
FIG. 9 is a side view of the cyclone separator of FIG. 8 shown encased in a housing.
Figure 10:
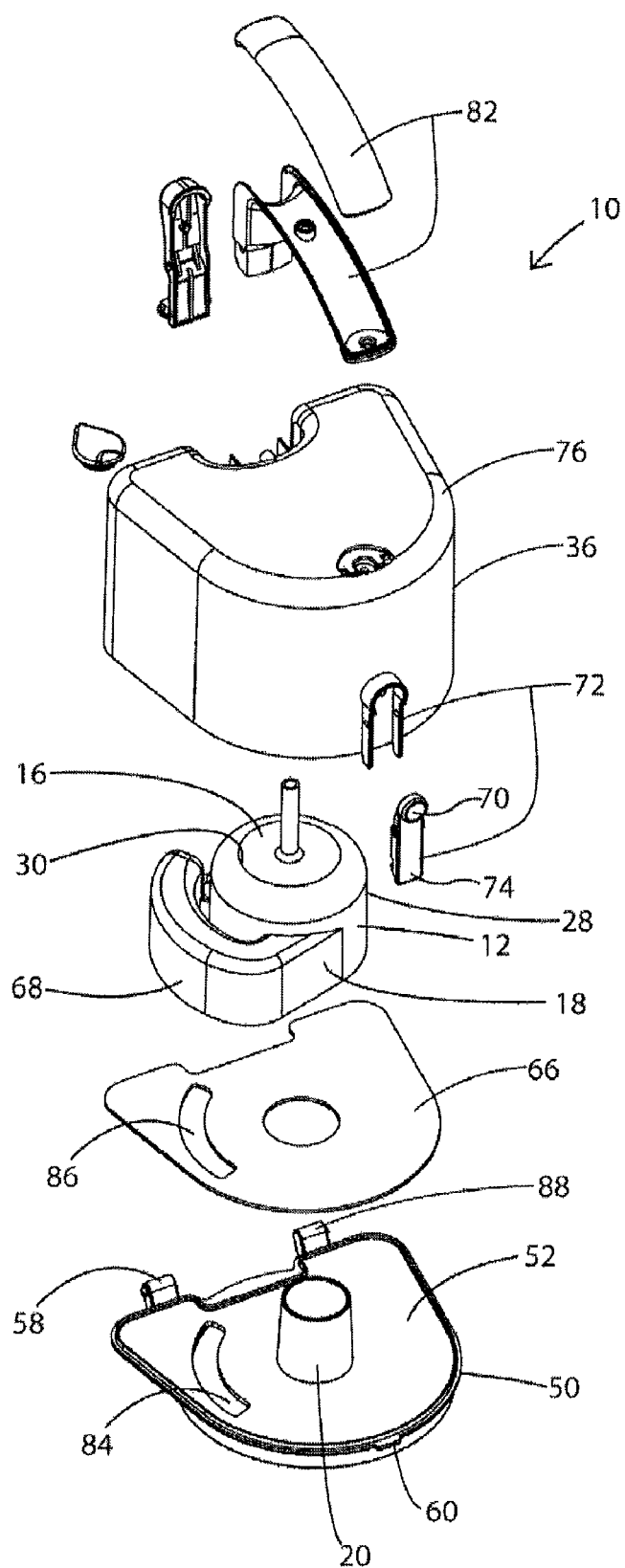
FIG. 10 is an exploded view of the second embodiment of FIG. 8.

In order to permit dirt collection chamber 32 to be emptied, an opening is provided to access the interior of dirt collection chamber 32. Accordingly, collection surface 34 may be moveably or removable mounted or a door provided to permit access to dirt collection chamber 32. For example, collection surface 34 may be removable, as exemplified in FIG. 6. Alternately, or in addition, collection surface 34 may be pivotally mounted. For example, as exemplified in FIGS. 19 and 20, collection surface 34 is pivotally mounted to sidewall 36 by pivot pin 78. See also for example, the embodiment of FIG. 9.

It will be appreciated that larger particulate matter may be collected in cyclone chamber 26. Accordingly, in any embodiment disclosed herein, access is also provided to the interior of cyclone chamber 26. For example, cyclone chamber 26 may be opened independently of collection chamber 32. Alternately, cyclone chamber 26 may be opened when dirt collection chamber 32 is opened so that cyclone chamber 26 and collection chamber 32 may be emptied concurrently.

Accordingly, it will be appreciated that cyclone chamber 26 and collection chamber 32 are each openable. For example, lower end 16 and collection surface 34 may be each moveably mounted and may be joined together so that cyclone chamber 26 and collection chamber 32 are concurrently opened. It will be appreciated that, when collection surface 34 is opened as exemplified in FIG. 11 and FIG. 20, all of the cross sectional area of dirt collection chamber 32 above the opening portion is exposed. Similarly, when lower end 16 is opened as exemplified in FIG. 11 and FIG. 20, all of the cross sectional area of cyclone chamber 26 above the opening portion is exposed. Accordingly, when the openable portions are removed from below cyclone separator assembly 10 (e.g., by translating the openable portions sideways or pivoting them about 90 degrees), dirt may fall out of all portions of the chambers without shaking or otherwise agitating the assembly.

Figure 19:
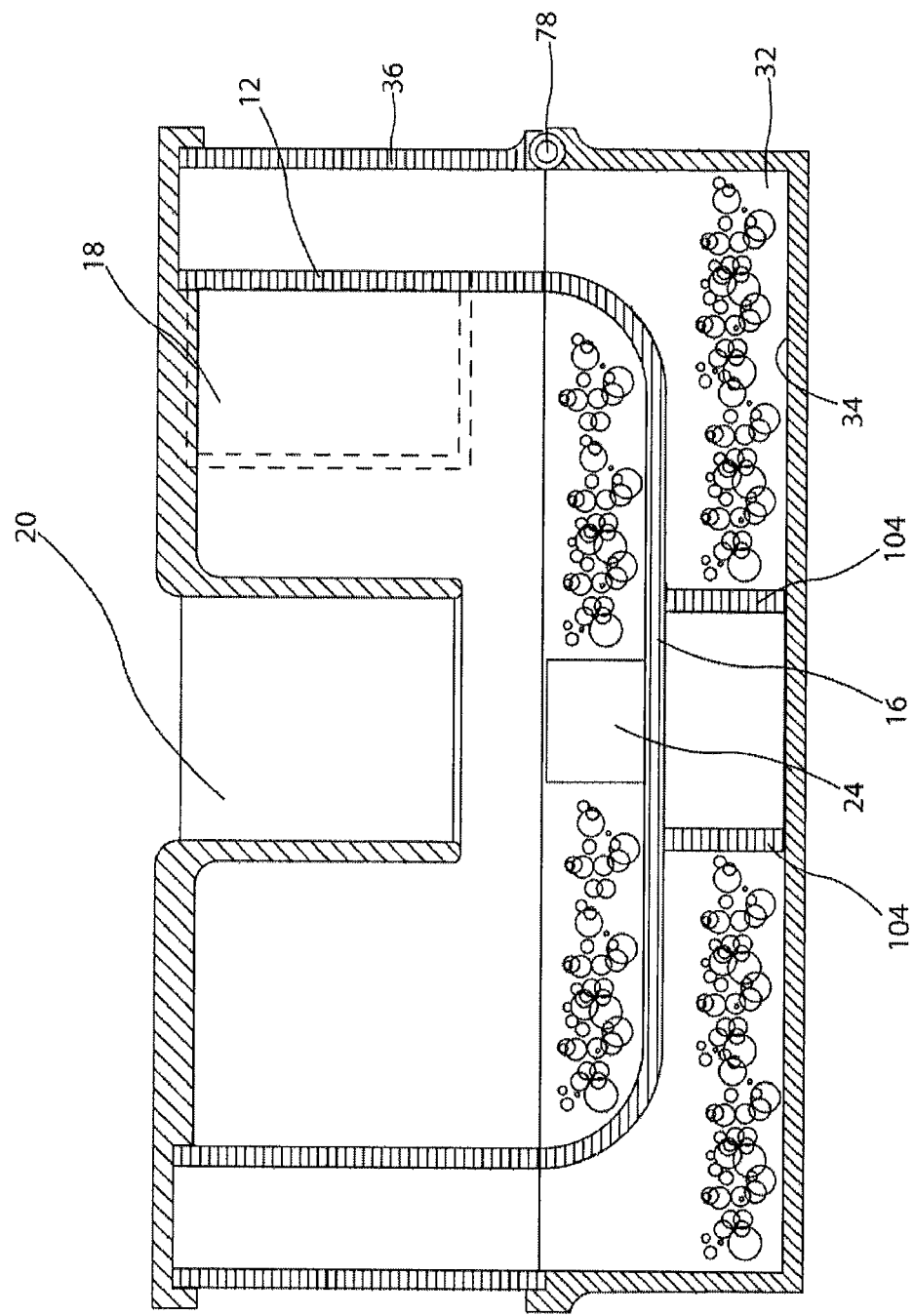
FIG. 19 is a front view of a vertical section of a cyclonic cleaning stage according to a eighth embodiment of this invention wherein the cyclone chamber is openable with the dirt collection chamber, showing the dirt collection chamber and the cyclone chamber in the closed position; and, FIG. 20 is a front view of a vertical section of a cyclonic cleaning stage according to a eighth embodiment of this invention wherein the cyclone chamber is openable with the dirt collection chamber, showing the dirt collection chamber and the cyclone chamber in the open position.
Figure 20:
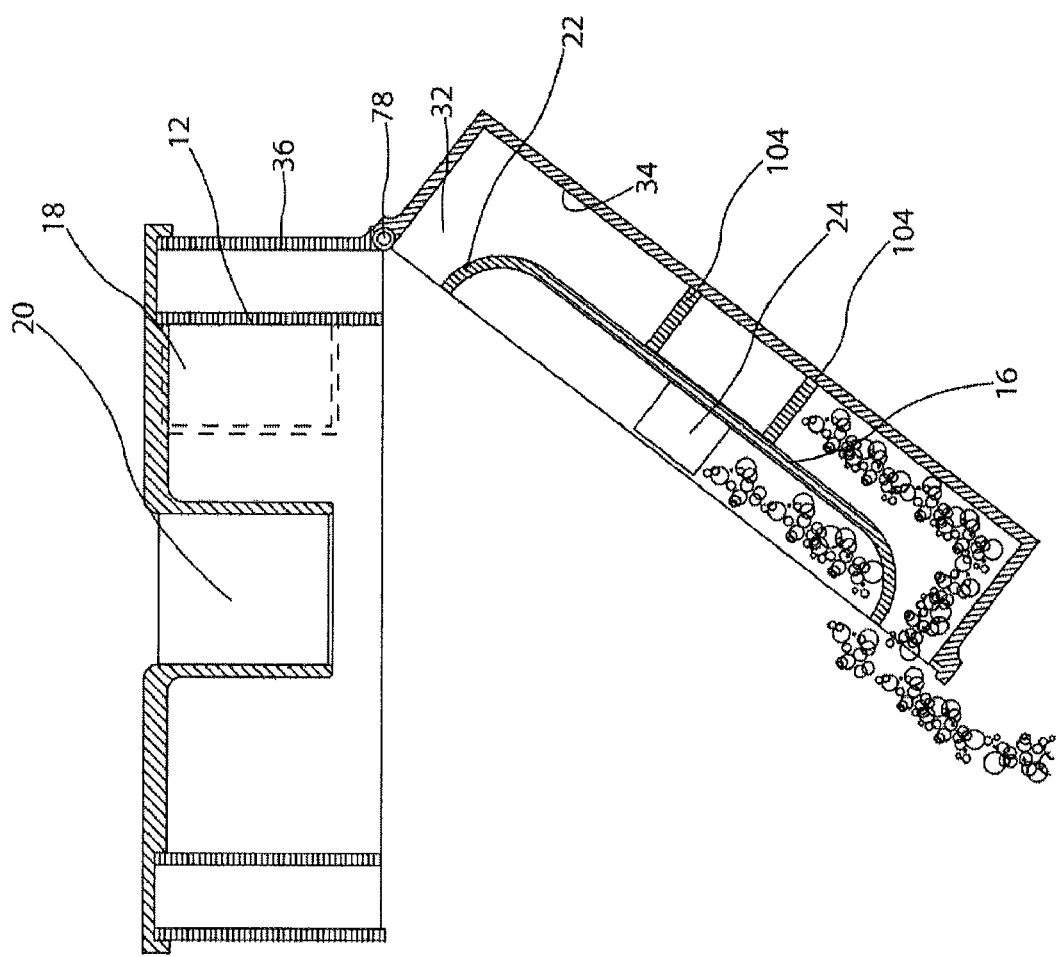

As exemplified in FIGS. 19 and 20, bottom or second end wall 16 of cyclone chamber 26 may be secured or joined to collection surface 34, such as by ribs 104 and constructed to be openable with collection surface 34. The openable portion of each of cyclone chamber 26 and collection chamber 32 may be moveably mounted by any means known in the art. For example, they may be slideably or translatably mounted. Preferably, they are pivotally mounted. Alternately, they may be removably mounted, such as by means of a screw mount, a bayonet mount or securing members such as wing nuts.

As exemplified, cyclone chamber is openable at the juncture of transition member 22 and sidewall 12. Accordingly, when a latch or lock is released, collection surface 34 may be moved to the open position shown in FIG. 20 and accordingly, bottom 16 and transition member 22 are concurrently moved to the open position.

In an alternate embodiment, cyclone chamber 26 may be inverted. In such a case, as exemplified in FIGS. 8-12, collection surface 34 is spaced from opposed surface 33. Collection surface 34 and the first portion of the cyclone casing are openable and, preferably concurrently openable. For example, they may be moveably mounted and connected together. They may be moveably mounted by any means known in the art. For example, they may be slideably or translatably mounted. Preferably, they are pivotally mounted. Alternately, they may be removably mounted, such as by means of a screw mount, a bayonet mount or securing members such as wing nuts. For example, as exemplified in FIGS. 11 and 12, the bottom of the cyclone chamber (when the cyclone chamber is in an inverted orientation) and the collection chamber may both be emptied at the same time by the cyclone chamber and the dirt collection chamber having a bottom panel that are adjacent (e.g., lie in a common plane) and are preferably integrally formed.

It will be appreciated that bottom 16 may be constructed to be opened subsequently to collection chamber 32 (e.g., bottom 16 may not be secured to collection surface 34).

If side air passage 56 is provided, then collection surface 34 may incorporate a cut out 62, which meets, preferably in an airtight manner, with bottom 64 of side air passage 56.

An alternate embodiment is shown in FIGS. 8-12. In this alternate embodiment, the cyclone is inverted. Accordingly, air inlet 18 and air outlet 20 are provided in first end 14, which comprises the lower end of the cyclone separator apparatus 10. Accordingly, in operation, air will enter inlet 18 via, e.g., tangential passage 68. The air will then travel upwardly in a cyclonic fashion in cyclone chamber 26 prior to exiting through outlet 20, which is preferably provided in first end 16. Heavier material (e.g. particulate material) will exit outlet 24 provided, preferably, in transition member 22 and accumulate in the separated material collection chamber 32. If a sealing gasket 66 is optionally provided as exemplified in FIG. 10, then the upper surface of gasket 66 functions as collection surface 34.

Figure 11:
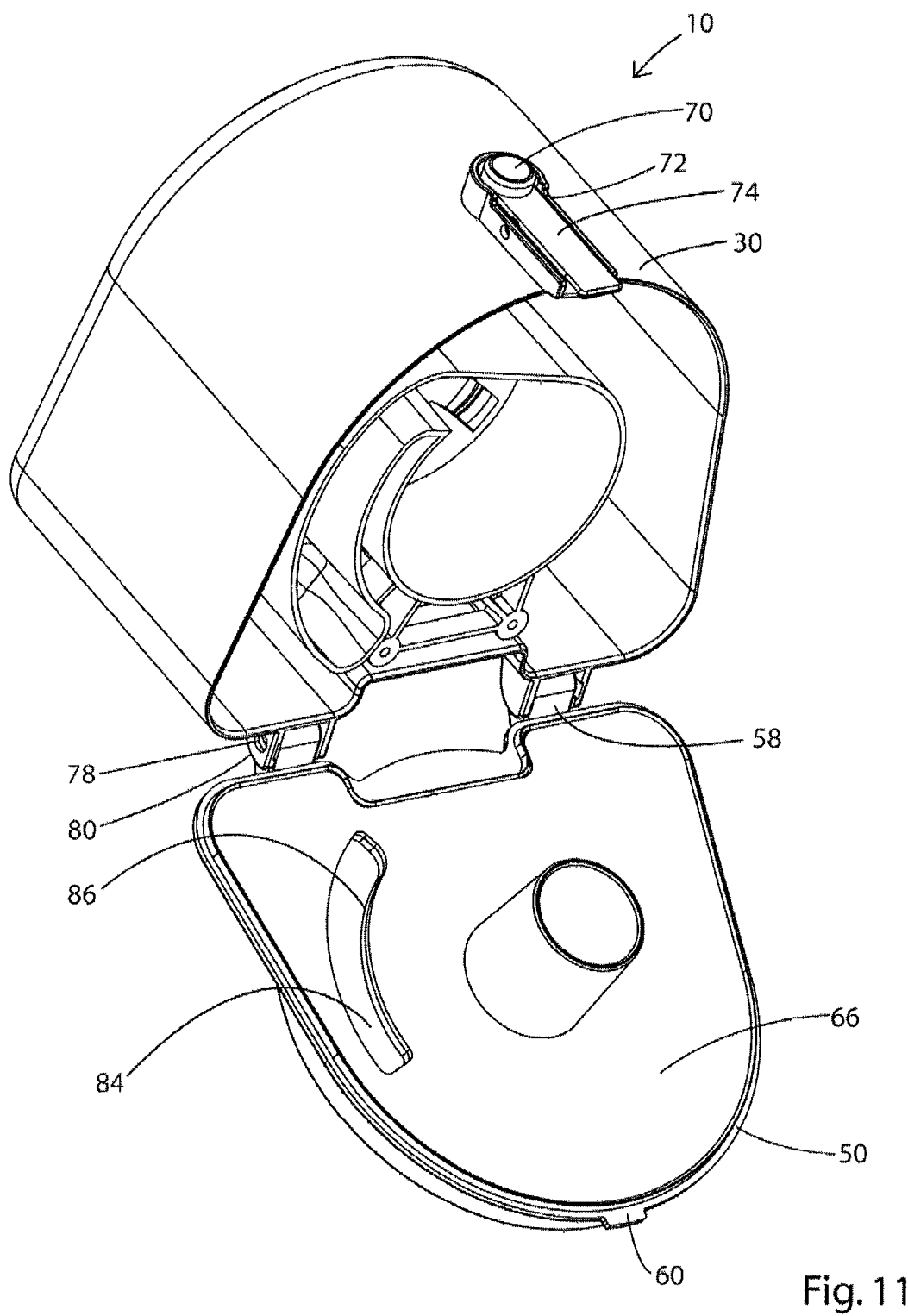
FIG. 11 is a perspective view from below of the cyclone separator of FIG. 8 showing an optional embodiment that permits the cyclone separator to be opened to permit emptying.

In order to empty cyclone separator assembly 10, a latch 72 may be provided. For example, button 70 of latch 72 may be pressed moving arm 74 outwardly thereby disengaging arm 74 from flange 60, thereby permitting bottom panel 50 to pivot downwardly (as shown in FIGS. 11 and 12) to permit the interior cyclone chamber 26 and collection area 22 to be emptied. Preferably, outlet 20 is mounted to, e.g., integrally formed with, panel 50. Accordingly, when panel 50 is opened, outlet 20 is removed from cyclone chamber 26 thereby exposing all of the interior of cyclone chamber 26 for emptying. Bottom panel 50 may be pivotally mounted to sidewall 36 of casing 76 such as by pivot pin 78 extending transversely to connect flange 58 of bottom panel 50 with flange 80 affixed to sidewall 36.

Accordingly, by opening bottom panel 50, preferably over a garbage can or the like, material collected inside cyclone chamber 26 and collection chamber 32 may be emptied. In this embodiment, the collection surface 34 and second end 16 are integrally formed (i.e. they are defined by bottom panel 50). Accordingly, both chambers may be emptied concurrently. In an alternate design they may be separately opened (e.g., if collection surface 34 and second end 16 are separate members).

In a particularly preferred embodiment, cyclone separator apparatus 10 comprises an upper portion of an upright vacuum cleaner. Accordingly, housing 76 may be provided with a handle 82 which may be connected to cyclone separator apparatus 10 by any means known in the art. Air inlet 18 may be in airflow communication with a dirty air inlet or the like of a vacuum cleaner, as a first or subsequent cleaning stage, via opening 84 in panel 50 and opening 86 in optional gasket 66.

Figure 13:
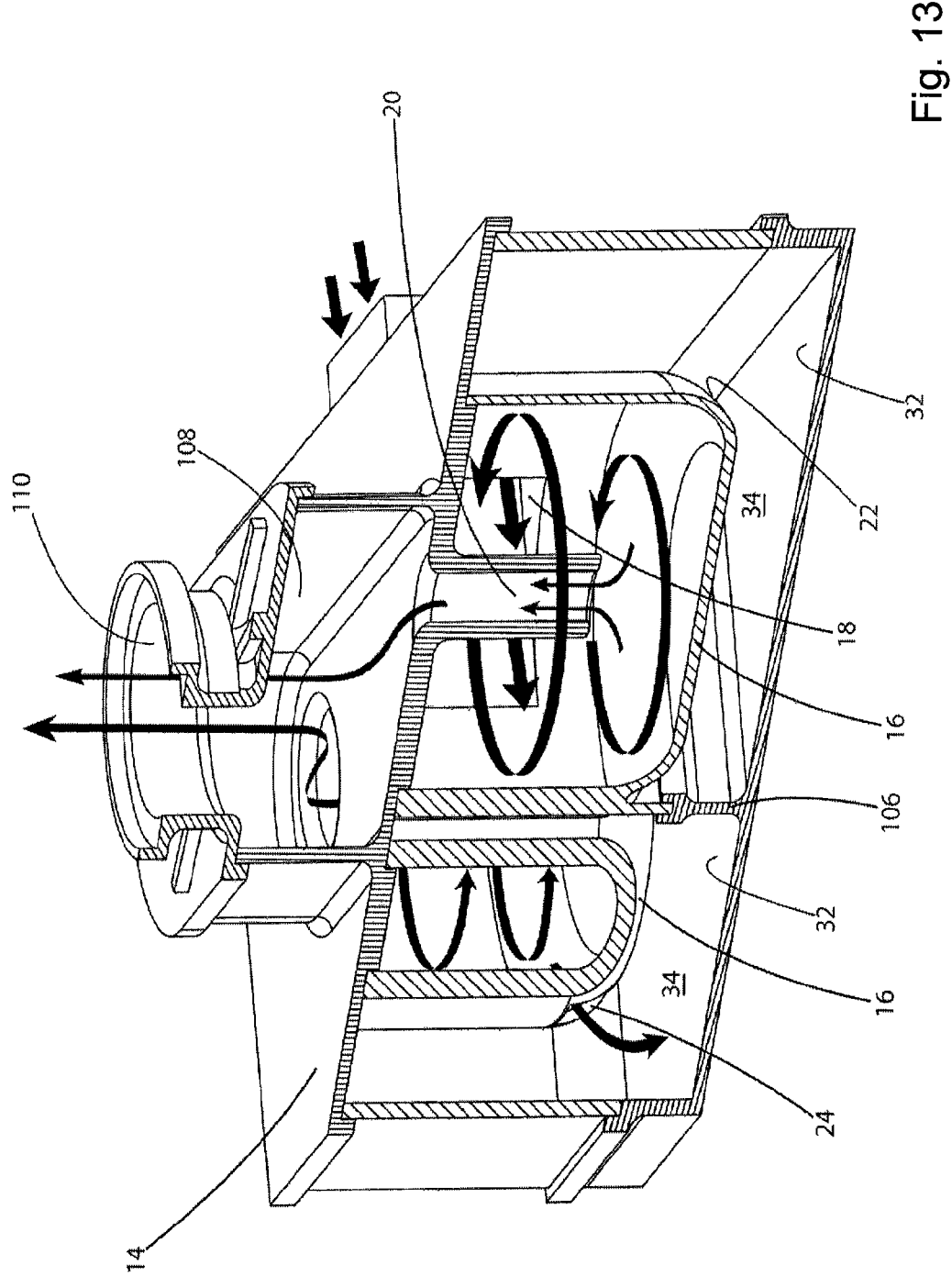
FIG. 13 is a vertical section through a third embodiment of a cyclonic cleaning stage according to this invention wherein a plurality of cyclone separators are connected in parallel.
Figure 14:
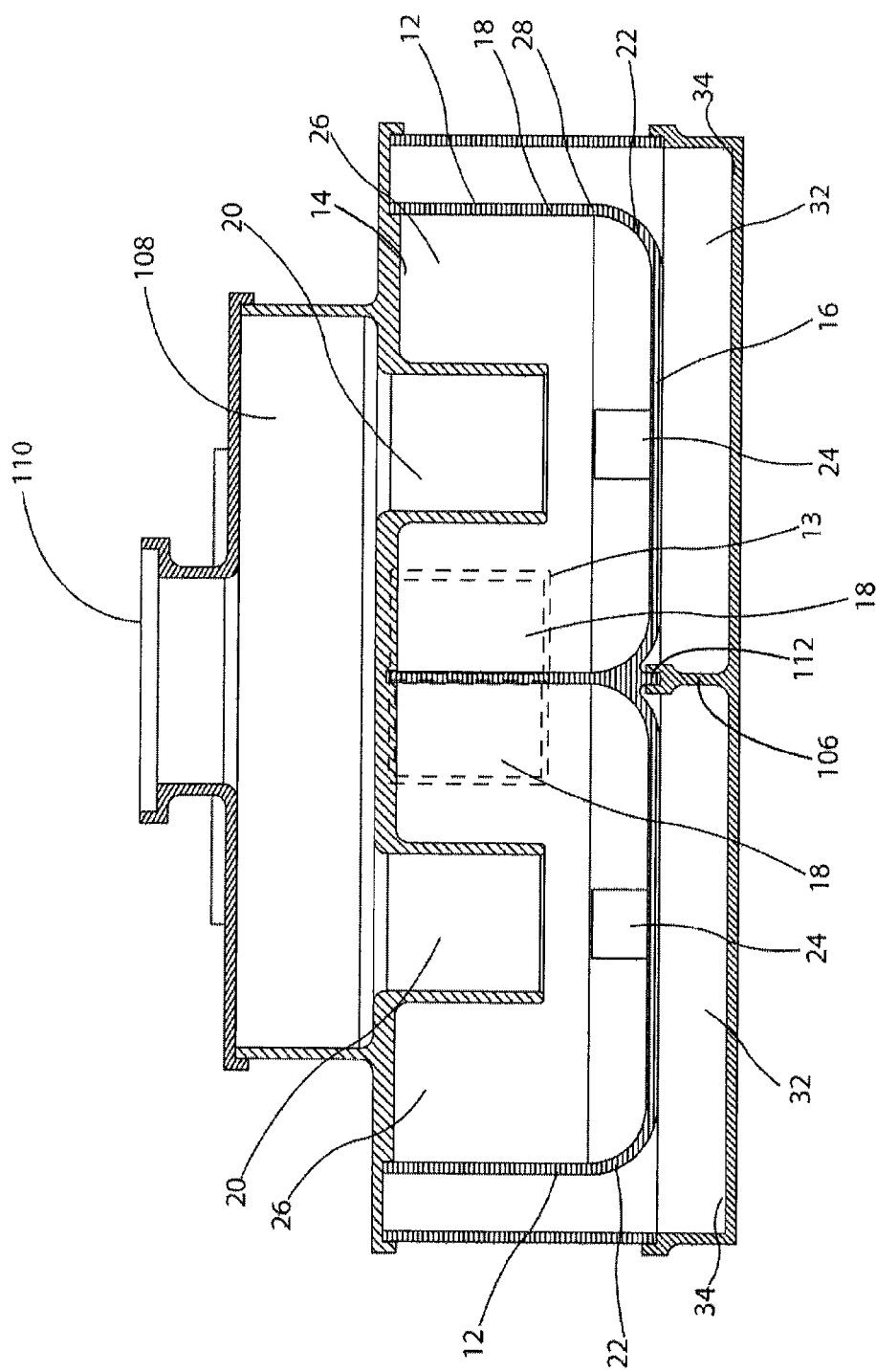
FIG. 14 is a front view of the vertical section of the cyclonic cleaning stage of FIG. 13.
Figure 15:
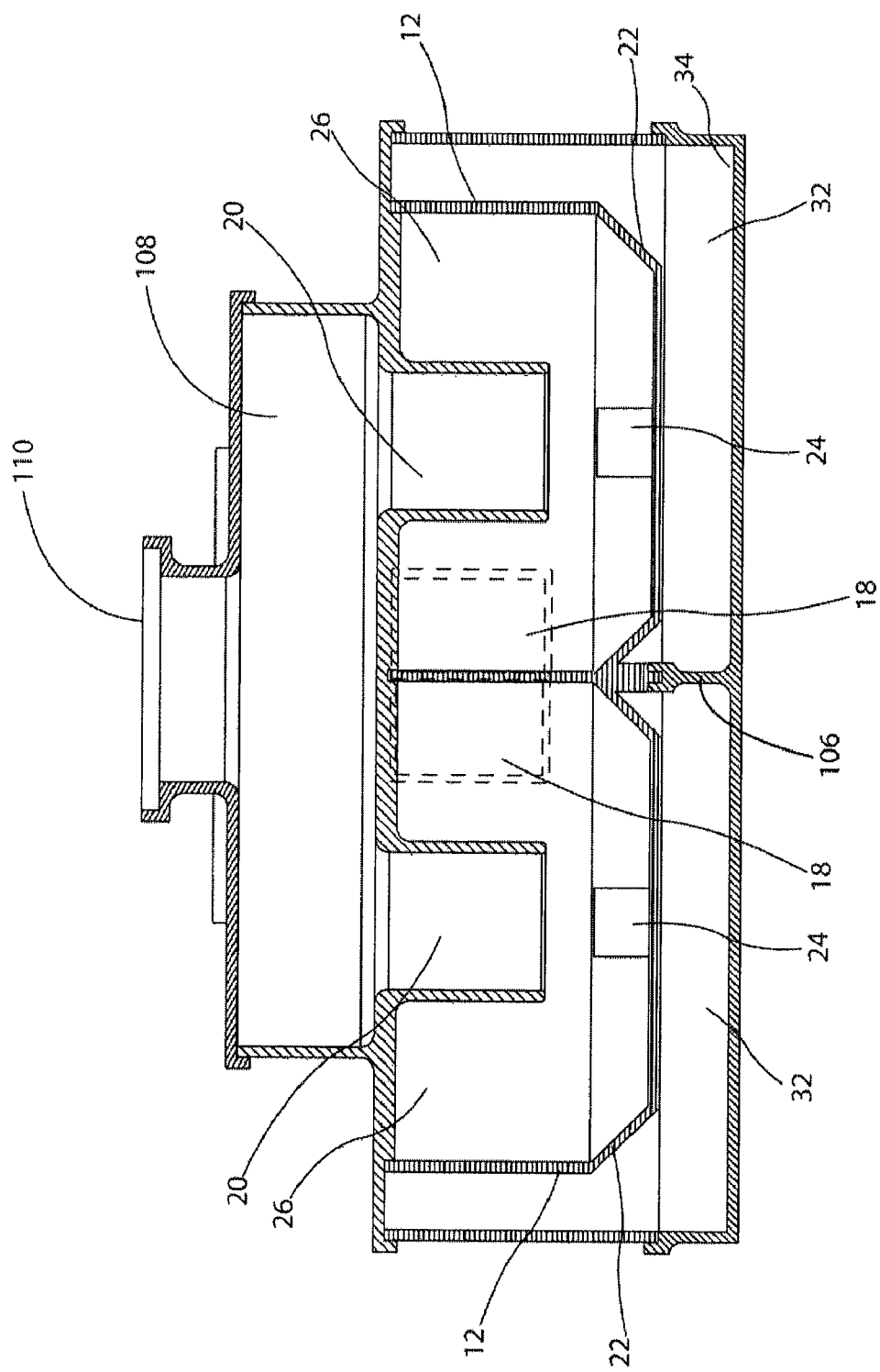
FIG. 15 is a front view of a vertical section of a cyclonic cleaning stage according to a fourth embodiment of this invention wherein the transition member is angled.
Figure 16:
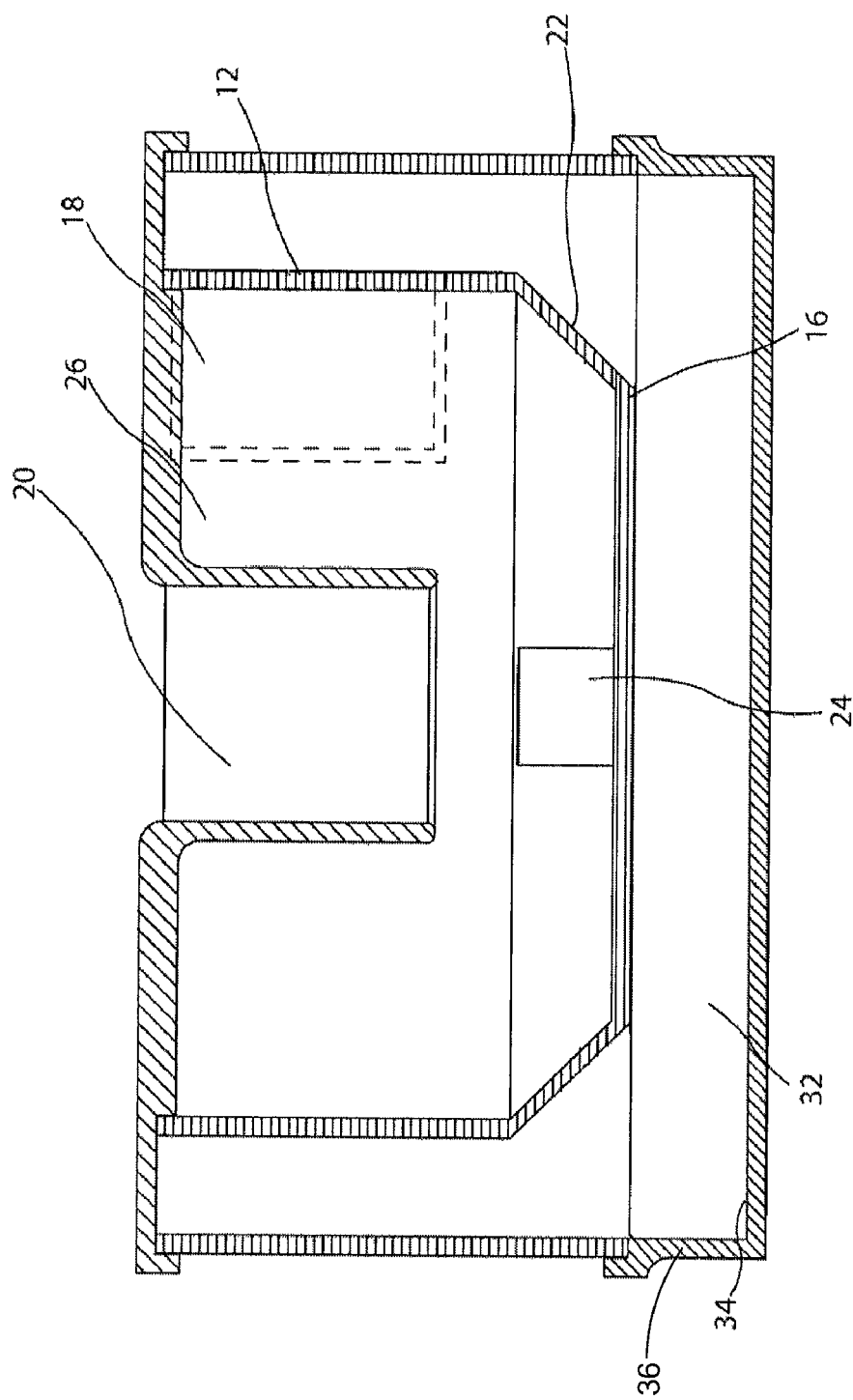
FIG. 16 is a front view of a vertical section of a cyclonic cleaning stage according to a fifth embodiment of this invention wherein the transition member is angled and the cyclonic cleaning stage comprises a single cyclone.

Further alternate embodiments are exemplified in FIGS. 13-15. In these alternate embodiments, a plurality of the cyclone separators 10 is provided. Preferably, the plurality of cyclone separators 10 is provided in parallel. More preferably, the plurality of cyclone separators 10 is provided as a second cleaning stage, more preferably a second cyclonic cleaning stage and most preferably a second cyclonic cleaning stage of parallel cyclones in a surface cleaning apparatus. Any number of cyclone separator apparatus 10 may be provided.

Each cyclone chamber has its own dirt collection chamber 32 that is isolated from the collection chambers 32 of the other cyclone separators 10. For example, as shown, dividing walls 106 separate collection chambers 32. It will be appreciated that, in alternate embodiments, collection chambers 32 need not have common walls. Dividing walls 106 may be secured to extension 112 of sidewall 12 of 16 of cyclone chamber 26 (see for example, FIG. 14) so as to function as a rib 104, such that second end 16 and collection 34 open concurrently. Alternately, dividing walls 106 may be removable from engagement with extension 112 such that collection chamber 32 may be emptied independent of cyclone chamber 26. Accordingly, cyclone chamber 26 may be separately openable (e.g., it may have a separate latch 72).

As exemplified, outlets 20 of cyclone separators 10 are in airflow communication with a header 108 having, preferably, a single outlet 110. Accordingly, a single flow passage may be provided downstream from the cyclonic cleaning stage exemplified in FIGS. 13-15.

As exemplified, optionally inlets 18 of cyclone separators 10 may be positioned adjacent each other (e.g., side by side). See also FIG. 14. In such a case, collection chamber 32 may surround only the second section, and not the inlet section, of sidewall 12.

It will be appreciated that any of the alternate or optional configurations or features may be used single or in any particular combination or sub-combination with other configurations or features disclosed herein.

It will be appreciated by those skilled in the art that various modifications and additions may be made in each or within the scope of the following claims. In particular, it will be appreciated that one or more cyclones as disclosed herein may be provided in an appliance, preferably in a surface cleaning appliance and, more preferably in a vacuum cleaner. The cyclones may be provided at any orientation and are preferably either inverted or in an upright orientation.

The invention claimed is:

1. A cyclone separator comprising:
   (a) a cyclone casing defining a cyclone chamber and having first and second spaced apart portions, a fluid inlet, a fluid outlet, a sidewall and a separated material outlet, the first portion including a first end wall of the cyclone chamber and the second portion including an opposed second end wall of the cyclone chamber, the opposed second end wall is openable whereby the cyclone chamber is opened;
   (b) the fluid inlet is provided in the first portion; and,
   (c) a separated material collection chamber in communication with the separated material outlet and exterior to the cyclone chamber, the separated material collection chamber has an opposed surface facing the second end wall and spaced from the second end, and the opposed surface is openable whereby the separated material collection chamber is opened.

2. The cyclone separator of claim 1 wherein the cyclone chamber is openable concurrently with the separated material collection chamber.

3. The cyclone separator of claim 2 further comprising a joining member extending between the opposed surface and the second end wall.

4. The cyclone separator of claim 1 wherein each of the second end wall and the opposed surface is pivotally mounted and moveable between a closed position and an open position.

5. The cyclone separator of claim 1 wherein the cyclone chamber is openable at a position between the first and second end walls.

6. The cyclone separator of claim 1 wherein the separated material outlet is provided in the second portion of the cyclone casing.

7. The cyclone separator of claim 1 wherein the opposed surface is spaced at least about 0.5 inches from the second end wall.

8. The cyclone separator of claim 1 wherein a single separated material outlet is provided.

9. The cyclone separator of claim 1 wherein the separated material outlet is positioned from about 90 to about 330° around the cyclone casing in a flow direction from the fluid inlet.

10. The cyclone separator of claim 1 wherein the separated material outlet is positioned from about 180 to about 300° around the cyclone casing in a flow direction from the flow inlet.

11. The cyclone separator of claim 1 wherein the separated material collection chamber surrounds at least a portion of the cyclone chamber.

12. A surface cleaning apparatus comprising the cyclone separator of claim 1.

13. A cyclone separator comprising:
   (a) a cyclone casing defining a cyclone chamber and having first and second spaced apart portions, a fluid inlet, a fluid outlet, a sidewall and a separated material outlet, the first portion including a first end wall of the cyclone chamber and the second portion including an opposed second end wall;
   (b) the fluid inlet is provided in the first portion;
   (c) a separated material collection chamber in communication with the separated material outlet and exterior to the cyclone chamber, the separated material collection chamber having first and second portions, the first portion of the separated material collection chamber located proximate the first end wall of the cyclone chamber; and,
   (d) the second portions of the cyclone casing and the first portion of the separated material collection chamber are each openable whereby the cyclone chamber and the separated material collection chamber are each opened.

14. The cyclone separator of claim 13 wherein the cyclone chamber and the separated material collection chamber are concurrently openable.

15. A surface cleaning apparatus comprising the cyclone separator of claim 14.

16. The surface cleaning apparatus of claim 15 wherein the second end wall is positioned below the first end wall.

17. The surface cleaning apparatus of claim 16 wherein, the cyclone separator comprises a second cyclonic cleaning stage of the surface cleaning apparatus.

18. The surface cleaning apparatus of claim 17 wherein, a plurality of the cyclone separators are connected in parallel to provide the second cyclonic cleaning stage.

19. The cyclone separator of claim 13 wherein the separated material outlet is provided in the second portion of the cyclone casing.

20. The cyclone separator of claim 13 wherein the fluid outlet is removed from the cyclone chamber when the cyclone chamber is opened.

21. The cyclone separator of claim 13 wherein the first portion of the separated material collection chamber has an end wall and the end wall and the first end wall of the cyclone casing are openable.

22. The cyclone separator of claim 21 wherein the end wall of the separated material collection chamber and the first end wall of the cyclone casing are of a unitary construction.

23. The cyclone separator of claim 21 wherein the end wall of the separated material collection chamber and the first end wall of the cyclone casing are pivotally openable.

24. The cyclone separator of claim 13 wherein the separated material collection chamber surrounds at least a portion of the cyclone chamber.

25. The cyclone separator of claim 13 wherein the separated material collection chamber has an opposed surface facing the second end wall of the cyclone chamber and spaced from the second end wall.

26. The cyclone separator of claim 13 wherein the separated material collection chamber surrounds all of the cyclone chamber and the separated material collection chamber has an opposed surface facing the second end wall end of the cyclone casing and spaced from the second end wall.

27. The cyclone separator of claim 13 wherein the second portion of the cyclone casing includes a transition member provided adjacent the second end wall of the cyclone casing, the transition member having an inner surface, at least a portion of which extends in a different orientation to both the sidewall and the second end wall.

* * * * *